United States Patent
Ikeda et al.

(10) Patent No.: US 8,737,625 B2
(45) Date of Patent: May 27, 2014

(54) DATA RECEIVING APPARATUS, DATA RECEIVING METHOD, AND NON-TRANSITORY COMPUTER READABLE MEDIUM STORING PROGRAM

(75) Inventors: Motoshige Ikeda, Kanagawa (JP);
Tadahiro Watanabe, Kanagawa (JP);
Masahiro Iio, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 95 days.

(21) Appl. No.: 13/372,020

(22) Filed: Feb. 13, 2012

(65) Prior Publication Data

US 2012/0213374 A1    Aug. 23, 2012

(30) Foreign Application Priority Data

Feb. 23, 2011    (JP) .................................. 2011-037503

(51) Int. Cl.
*H04K 1/00*    (2006.01)
*H04N 7/167*   (2011.01)
*H04N 21/4405* (2011.01)
*H04L 25/03*   (2006.01)

(52) U.S. Cl.
CPC ......... *H04N 7/1675* (2013.01); *H04N 21/4405* (2013.01); *H04L 25/03866* (2013.01)
USPC ................ 380/287; 375/372; 375/220; 713/2

(58) Field of Classification Search
CPC .................................................. H04N 7/1675
USPC ........................................................ 380/287
See application file for complete search history.

(56) References Cited

U.S. PATENT DOCUMENTS

| | | | | |
|---|---|---|---|---|
| 2006/0156083 | A1* | 7/2006 | Jang et al. ...................... | 714/700 |
| 2007/0177701 | A1* | 8/2007 | Thanigasalam ............... | 375/372 |
| 2009/0041099 | A1* | 2/2009 | Das Sharma et al. ......... | 375/220 |
| 2010/0251001 | A1* | 9/2010 | Drescher et al. .................. | 714/2 |
| 2011/0208954 | A1* | 8/2011 | Barrett et al. ..................... | 713/2 |

FOREIGN PATENT DOCUMENTS

JP    2005-268910 A    9/2005

OTHER PUBLICATIONS

Universal Serial Bus 3.0 Specification, Revision 1.0, Jun. 6, 2011, 531 pages.

* cited by examiner

*Primary Examiner* — Carl Colin
*Assistant Examiner* — Syed Zaidi
(74) *Attorney, Agent, or Firm* — Foley & Lardner LLP

(57) ABSTRACT

A receiving apparatus according to the present invention is able to normally decode reception data even when a part of an initialization symbol during training is corrupted. The receiving apparatus includes an initialization signal generation unit that generates an initialization signal, and a descrambling circuit that descrambles reception data by a descrambler initialized by the initialization signal. The reception data includes a training data set for establishing connection of high-speed serial communication, the training data set including one or more TSn ordered sets. The TSn ordered set includes one or more COM symbols and one or more pieces of data other than COM symbols. The initialization signal generation unit generates the initialization signal at an initialization last timing at which at least the last COM symbol among the COM symbols forming the last TSn ordered set included in the training data set is input to the descrambling circuit.

20 Claims, 29 Drawing Sheets

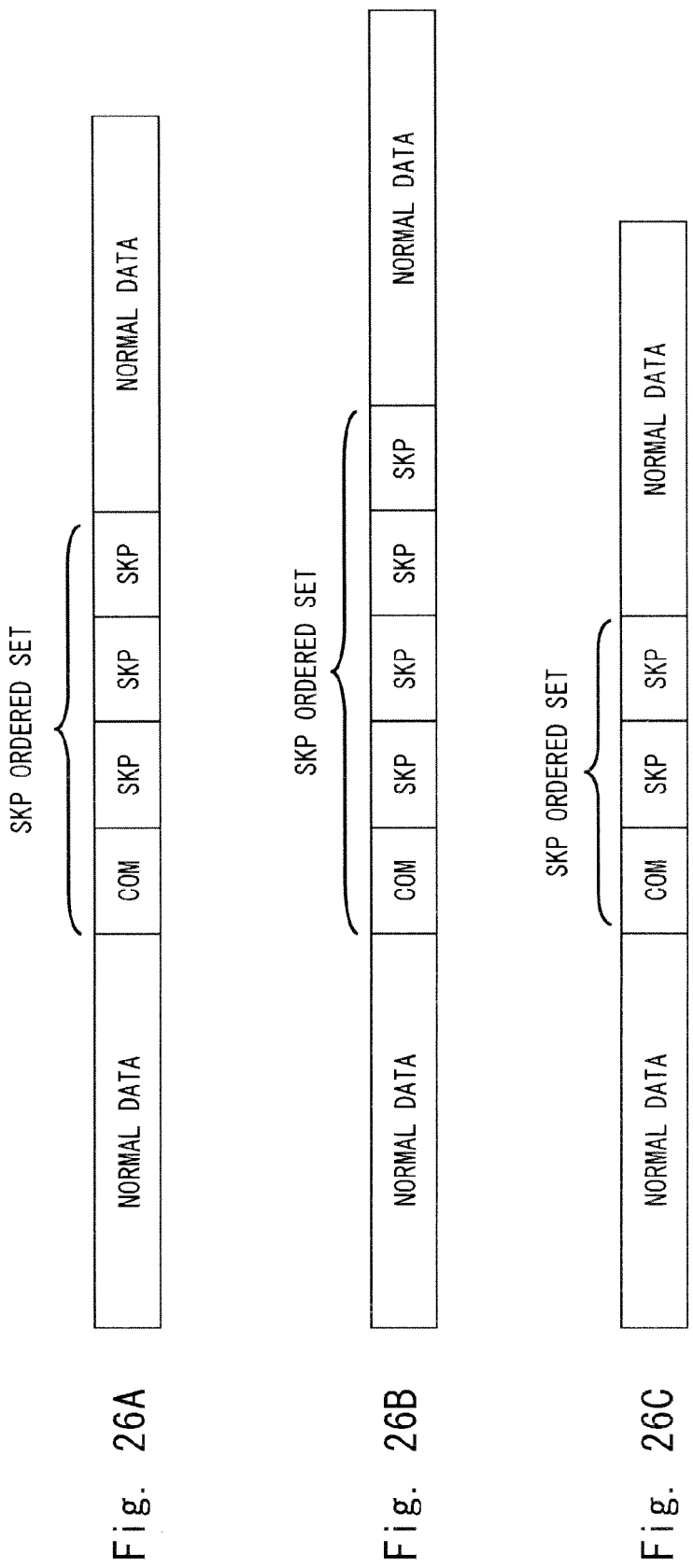

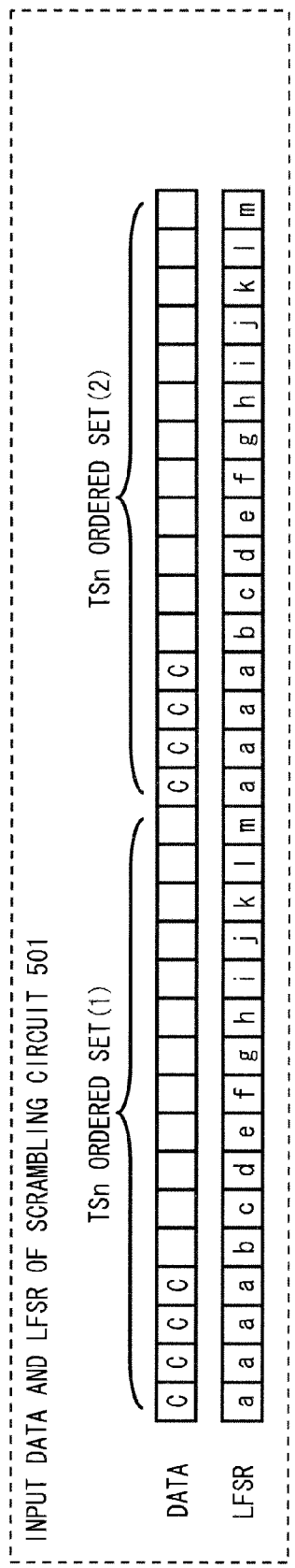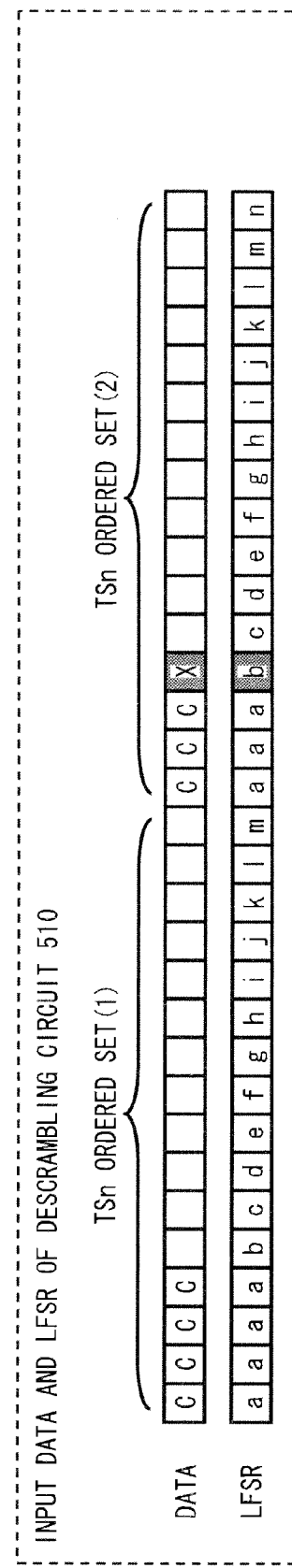

DATA RECEIVING APPARATUS, DATA RECEIVING METHOD, AND NON-TRANSITORY COMPUTER READABLE MEDIUM STORING PROGRAM

CROSS-REFERENCE TO RELATED APPLICATIONS

This application is based upon and claims the benefit of priority from Japanese patent application No. 2011-037503, filed on Feb. 23, 2011, the disclosure of which is incorporated herein in its entirety by reference.

BACKGROUND

The present invention relates to a data receiving apparatus, a data receiving method, and a non-transitory computer readable medium storing a program that are preferably used for serial communication, especially for high-speed serial communication. More specifically, the present invention relates to a data receiving apparatus, a data receiving method, and a non-transitory computer readable medium storing a program that transmit and receive data scrambled in a transmission side and descrambled in a reception side.

In high-speed serial communication, scramble processing is performed on data to be transmitted in order to prevent periodicity of data (continuation of data of the same pattern). Therefore, descramble processing is performed on data that is received.

Japanese Unexamined Patent Application Publication No. 2005-268910 discloses a data receiving apparatus related to the present invention. In the data receiving apparatus according to Japanese Unexamined Patent Application Publication No. 2005-268910, initialization of a descrambling circuit can be performed even when a part of an initialization symbol including a COM symbol or timing adjusting data including an SKP symbol is corrupted due to the influence of noise on a transmission line. Description will be made hereinafter by taking a PCI Express bus system as an example.

FIG. 24 shows a data transfer apparatus disclosed in Japanese Unexamined Patent Application Publication No. 2005-268910. As shown in FIG. 24, a scrambling circuit 501 scrambles data to be transmitted. An 8B/10B encoder 502 encodes 8-bit data that is scrambled to 10-bit data in which data of "0" or "1" does not continue for predetermined times or more. A parallel/serial (P/S) converter 503 converts parallel data into serial data. A Tx 504 is a sending transmission line (lane) of differential form. A data transmitting apparatus is thus formed. An Rx 505 is a receiving transmission line of differential form. A serial/parallel (S/P) converter 506 converts reception data from serial data into parallel data. An elastic buffer 507 is a buffer circuit that adjusts deviations of clock frequencies between the transmission side and the reception side. An 8B/10B decoder 508 decodes 10-bit data into 8-bit data. An SKP/COM converter 509 is a symbol converter that converts SKP symbols into COM symbols. A descrambling circuit 510 descrambles reception data. A data receiving apparatus is thus formed.

The scrambling circuit 501 scrambles the transmission data. Further, the 8B/10B encoder 502 encodes 8-bit data to 10-bit data so that data of "0" or "1" does not continue for predetermined times or more. Then the P/S converter 503 converts parallel data into serial data, and transmits the serial data to the sending transmission line (lane) of differential form 504. Note that clocks are embedded in data signals. Further, the data received from the receiving transmission line (lane) of differential form 505 is converted from the serial data into the parallel data by the S/P converter 506. Then, the elastic buffer circuit 507 corrects deviations of clock frequencies between the transmission side and the reception side, the 8B/10B decoder 508 decodes 10-bit data into 8-bit data, the SKP/COM converter 509 converts all the SKP symbols in an SKP ordered set into COM symbols, and the descrambling circuit 510 descrambles the data.

In such a PCI Express bus system, each of the scramble processing by the scrambling circuit 501 and the descramble processing by the descrambling circuit 510 is executed by a circuit using a linear feedback shift register (LFSR) shown in FIG. 25. In FIG. 25, S0 to S15, and D0 to D7 denote shift registers, and X1~X4 denote EXOR circuits. The scrambling here is indicated by the following polynomial expression.

$$G(X)=X16+X5+X4+X3+1$$

Rules shown below are applied to the scrambling circuit 501 and the descrambling circuit 510.
(1) Shift registers are initialized to an initial value (hFFFF) in COM symbols.
(2) Shift registers are shifted by 8 bits in other symbols than SKP symbols (shift registers are not shifted in SKP symbols).
(3) Scramble processing is performed in all D codes except a training sequence and a compliance pattern.
(4) Scrambling is not performed in all K codes.

The COM symbol here denotes data or an initializing symbol for initializing the scrambling circuit 501 and the descrambling circuit 510. Further, the SKP symbol denotes timing adjusting data to correct deviations of clock frequencies between the transmission side and the reception side without shifting the LFSRs of the scrambling circuit 501 and the descrambling circuit 510. Further, the K code is 12 kinds of special data other than normal data, and includes the above COM symbols and SKP symbols. Meanwhile, the D code denotes a data symbol other than controlling data such as the K code.

In the PCI Express bus system, a timing adjusting data set (SKP ordered set) is inserted at predetermined intervals (for each of 1080 to 1156 symbols) when data transfer becomes Idle (D0.0, i.e., when 00h of D code is transmitted) in order to absorb deviations of the clock frequencies between the transmission side and the reception side. As shown in FIG. 26A, this SKP ordered set includes one COM symbol and the following three SKP symbols.

In the elastic buffer circuit 507, SKP symbols are inserted as shown in FIG. 26B when the elastic buffer circuit 507 may generate underflow, and the number of SKP symbols is decreased as shown in FIG. 26C when the elastic buffer circuit 507 may generate overflow, thereby adjusting deviations of clock frequencies between the transmission side and the reception side.

In this way, the shift registers in the descrambling circuit 510 are set so as not to be shifted in the SKP symbols so that the SKP symbols after passing through the elastic buffer circuit 507 do not have a bad effect on normal data. Further, since the SKP ordered set definitely includes a COM symbol first, the shift registers are always in a state of an initial value at the position of the SKP symbols.

In Japanese Unexamined Patent Application Publication No. 2005-268910, the SKP/COM converter 509 replaces the SKP symbols in a data sequence after passing through the elastic buffer circuit 507 with COM symbols. FIGS. 27A, 27B, and 27C are diagrams for describing data input to the descrambling circuit 510 of the data receiving apparatus disclosed in Japanese Unexamined Patent Application Publication No. 2005-268910. It is assumed that an error is occurred in the first SKP symbol in an SKP ordered set, for example, as shown in FIG. 27B in a communication path or the like in data generated as shown in FIG. 27A. In such a case, according to the data receiving apparatus disclosed in Japanese Unexamined Patent Application Publication No. 2005-268910, as shown in FIG. 27C, all the SKP symbols are replaced with COM symbols before descrambling is performed. Therefore, the descrambling circuit 510 repeats initialization a plurality of times corresponding to the number of COM symbols that are replaced even when there is an error in the SKP symbol. Accordingly, the initialization is definitely performed, which makes it possible to definitely associate the descramble processing in the reception side with the scramble processing in the transmission side.

SUMMARY

Meanwhile, in high-speed serial communication such as the PCI Express bus system, a connection establishing data set is received a plurality of times to establish the connection. FIGS. 28A and 28B show input/output data of the data transmitting apparatus that performs high-speed serial communication, and a timing chart of the descrambling circuit 510 of the data receiving apparatus. In FIG. 28A, data is input data of the scrambling circuit 501 which is the transmission side, and an LFSR is a timing chart of an internal signal (showing a state of the scrambler) of the scrambling circuit 501.

In FIG. 28B, data is input data of the descrambling circuit 510 which is the reception side, and an LFSR denotes an internal signal (showing a state of the descrambler) of the descrambling circuit 510.

As shown in FIG. 28A, a connection establishing data set (in this example, a TS1 ordered set and a TS2 ordered set, for example, which are collectively referred to as a TSn ordered set) includes one or more LFSR initialization symbols (COM symbols) and a plurality of pieces of data.

The present inventor has found that, when the last LFSR initialization symbol (COM symbol) is corrupted in the connection establishing data set as shown in FIG. 28B, the LFSR cannot associate the descramble processing in the reception side with the scramble processing in the transmission side. Accordingly, the receiving apparatus related to the present invention cannot normally decode data when the last LFSR initialization symbol for training is corrupted. As a result, it is impossible to receive data required during the training, which requires re-execution of the training.

A first exemplary aspect of the present invention is a receiving apparatus that receives scrambled data by serial communication, including: an initialization signal generation unit that generates an initialization signal; and a descrambling circuit that descrambles reception data by a descrambler initialized by the initialization signal. The reception data includes a training data set for establishing connection of the serial communication, the training data set including one or more connection establishing data sets, and the connection establishing data set includes one or more initialization symbols and one or more pieces of data other than the initialization symbols. The initialization signal generation unit generates the initialization signal that initializes the descrambler at least at an initialization last timing at which the last initialization symbol among the initialization symbols forming the last connection establishing data set included in the training data set is input to the descrambler.

A second exemplary aspect of the present invention is a receiving method that receives scrambled data by serial communication, in which: the reception data includes a training data set for establishing connection of the serial communication, the training data set including one or more connection establishing data sets, and the connection establishing data set includes one or more initialization symbols and one or more pieces of data other than the initialization symbols, the method including: generating an initialization signal that initializes a descrambler at least at an initialization last timing at which the last initialization symbol among the initialization symbols forming the last connection establishing data set included in the training data set is input to the descrambler; and descrambling the reception data by the descrambler initialized by the initialization signal.

A third exemplary aspect of the present invention is a non-transitory computer readable medium that stores a program to cause a computer to execute processing for receiving scrambled data by serial communication, in which: the reception data includes a training data set for establishing connection of the serial communication, the training data set including one or more connection establishing data sets, and the connection establishing data set includes one or more initialization symbols and one or more pieces of data other than the initialization symbols, the non-transitory computer readable medium causes the computer to execute the following processing of: generating an initialization signal that initializes a descrambler at least at an initialization last timing at which the last initialization symbol among the initialization symbols forming the last connection establishing data set included in the training data set is input to the descrambler; and descrambling the reception data by the descrambler initialized by the initialization signal.

According to the present invention, the initialization signal for initializing the descrambler is generated at least at the initialization last timing at which the last initialization symbol among the initialization symbols forming the last connection establishing data set included in the training data set is input to the descrambler. Accordingly, it is possible to initialize the descrambler at the initialization last timing, and to associate the descramble processing in the reception side with the scramble processing in the transmission side.

According to the present invention, it is possible to provide a data receiving apparatus, a data receiving method, and a non-transitory computer readable medium storing a program that are capable of normally decoding reception data even when a part of the initialization symbols during training is corrupted.

BRIEF DESCRIPTION OF THE DRAWINGS

The above and other aspects, advantages and features will be more apparent from the following description of certain embodiments taken in conjunction with the accompanying drawings, in which:

FIG. 26A shows an SKP ordered set;

FIG. 26B shows an SKP ordered set;

FIG. 26C shows an SKP ordered set;

FIG. 28A shows input/output data of a data transmitting apparatus that performs high-speed serial communication; and FIG. 28B shows a timing chart of the descrambling circuit of the data receiving apparatus that performs high-speed serial communication.

DETAILED DESCRIPTION

Hereinafter, with reference to the accompanying drawings, specific embodiments of the present invention will be described in detail. In these embodiments, the present invention is applied to a data receiving apparatus in high-speed serial communication such as PCI Express.

As described above, when the last LFSR initialization symbol (e.g., COM symbol) of the last connection establishing data set included in the training data set is corrupted, the LFSR cannot associate descramble processing in a reception side with scramble processing in a transmission side. The training data set here is a series of data group including a connection establishing data set (e.g., TSn ordered set (TS1 ordered set and TS2 ordered set)) and a timing adjusting data set (e.g., SKP ordered set) to establish connection. On the other hand, according to the embodiments, the above problem is solved by generating an initialization signal to initialize the descrambler at least at a timing (initialization last timing T1) at which the last initialization symbol among initialization symbols forming the last connection establishing ordered set included in the training data set is input to the descrambler. In summary, even when the initialization symbol is corrupted (normal), the scrambler can be definitely initialized by this initialization signal. As a result, the reception data can be normally decoded.

First Embodiment of the Present Invention

Figure 1:
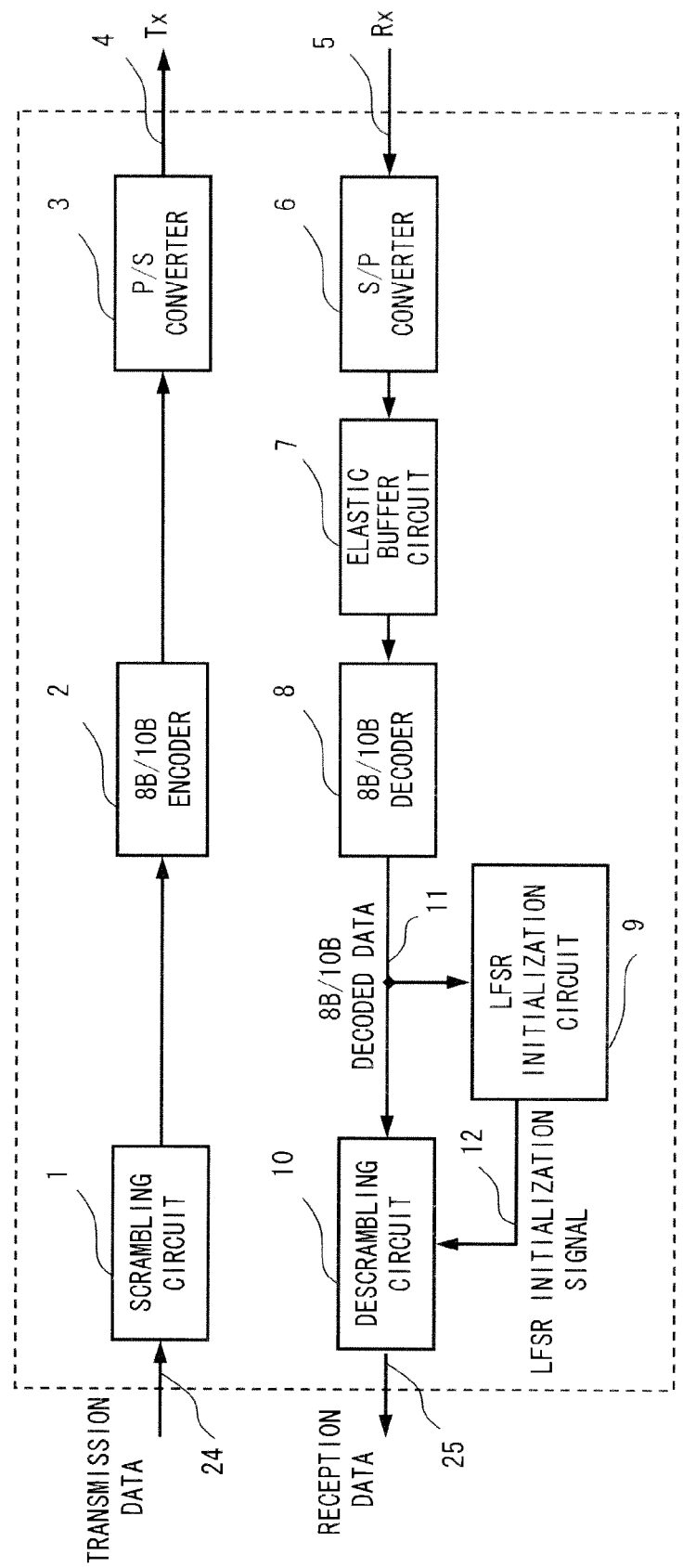
FIG. 1 shows a data transmitting apparatus and a data receiving apparatus according to a first embodiment of the present invention.

FIG. 1 shows a data transmitting apparatus and a data receiving apparatus according to a first embodiment of the present invention. As shown in FIG. 1, the data transmitting apparatus includes a scrambling circuit 1, an 8B/10B encoder 2, and a P/S converter 3. Note that this configuration is similar to a data transfer apparatus disclosed in Japanese Unexamined Patent Application Publication No. 2005-268910. Specifically, the scrambling circuit 1 scrambles data to be transmitted. The 8B/10B encoder 2 encodes scrambled 8-bit data to 10-bit data where data of "0" or "1" does not continue for predetermined number of times or more. The P/S converter 3 converts parallel data into serial data. A Tx 4 is a sending transmission line (lane) of differential form.

The data receiving apparatus includes an S/P converter 6, an elastic buffer circuit 7, an 8B/10 decoder 8, an LFSR initialization circuit 9, and a descrambling circuit 10. An Rx 5 is a receiving transmission line of differential form. The S/P converter 6 converts reception data from serial data into parallel data. The elastic buffer 7 is a buffer circuit that adjusts deviations of clock frequencies deviated between a transmission side and a reception side. The 8B/10B decoder 8 decodes 10-bit data to 8-bit data. The descrambling circuit 10 descrambles reception data.

The LFSR initialization circuit 9 receives 8B/10B decoded data 11 from the 8B/10B decoder 8, generates an LFSR initialization signal 12, and supplies the LFSR initialization signal 12 to the descrambling circuit 10. An LFSR (descrambler) of the descrambling circuit 10 is initialized by the LFSR initialization signal 12 at predetermined timings described later (initialization last timing, first initialization timing, and second initialization timing).

Figure 2A:
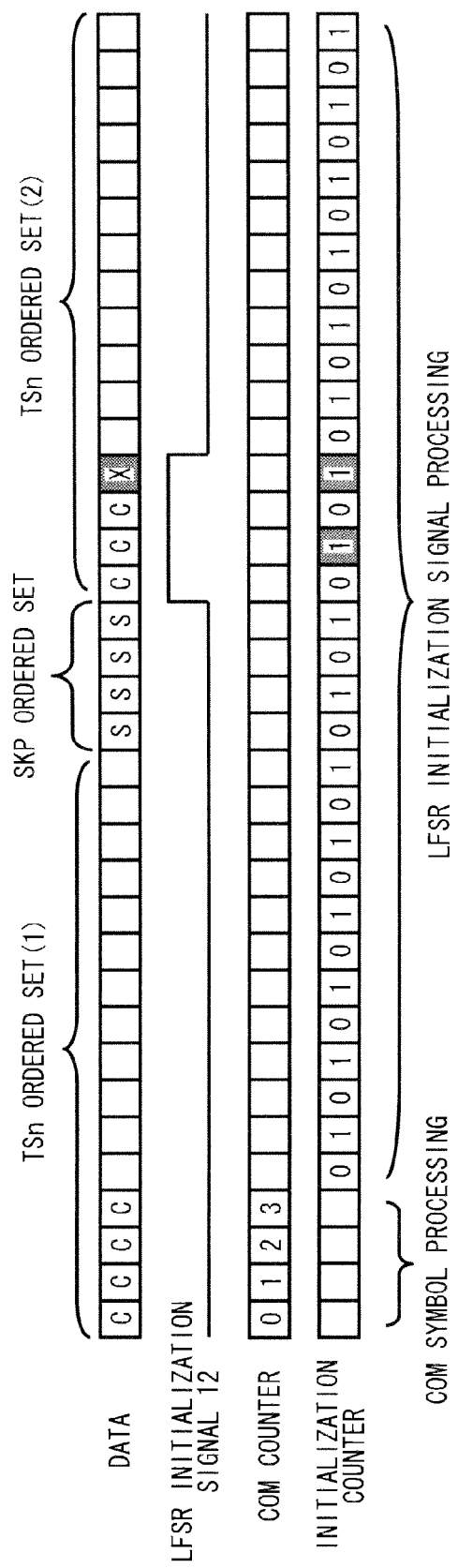
FIG. 2A shows data which is being trained according to the first embodiment of the present invention.

First, description will be made of training. FIG. 2A shows data which is being trained. In the high-speed serial communication such as USB 3.0, PCI Express or the like, as described above, a plurality of connection establishing data sets (a TS1 Ordered Set or a TS2 Ordered Set, hereinafter collectively referred to as a TSn ordered set) are received in order to establish connection between devices. Hereinafter, a period in which the TSn ordered set is received is called "training period". Further, in the training period, a timing adjusting data set (hereinafter referred to as an SKP ordered set) that is inserted between the TSn ordered sets is also received in addition to the TSn ordered set. In this specification, the TSn ordered set and the SKP ordered set received during the training are called a training data set.

FIG. 2A shows second last TSn ordered set (TSn ordered set (1)) in the training data set, the SKP ordered set, and the last TSn ordered set (TSn ordered set (2)). Note that the SKP ordered set may not be inserted at this timing.

As shown in FIG. 2A, the TSn ordered set includes one or more COM symbols and a plurality of pieces of data following the COM symbols. For example, in the PCI Express, the TSn ordered set includes one COM symbol, and 15 pieces of data. Further, in the USB 3.0, the TSn ordered set includes four COM symbols and 12 pieces of data.

Figure 2B:
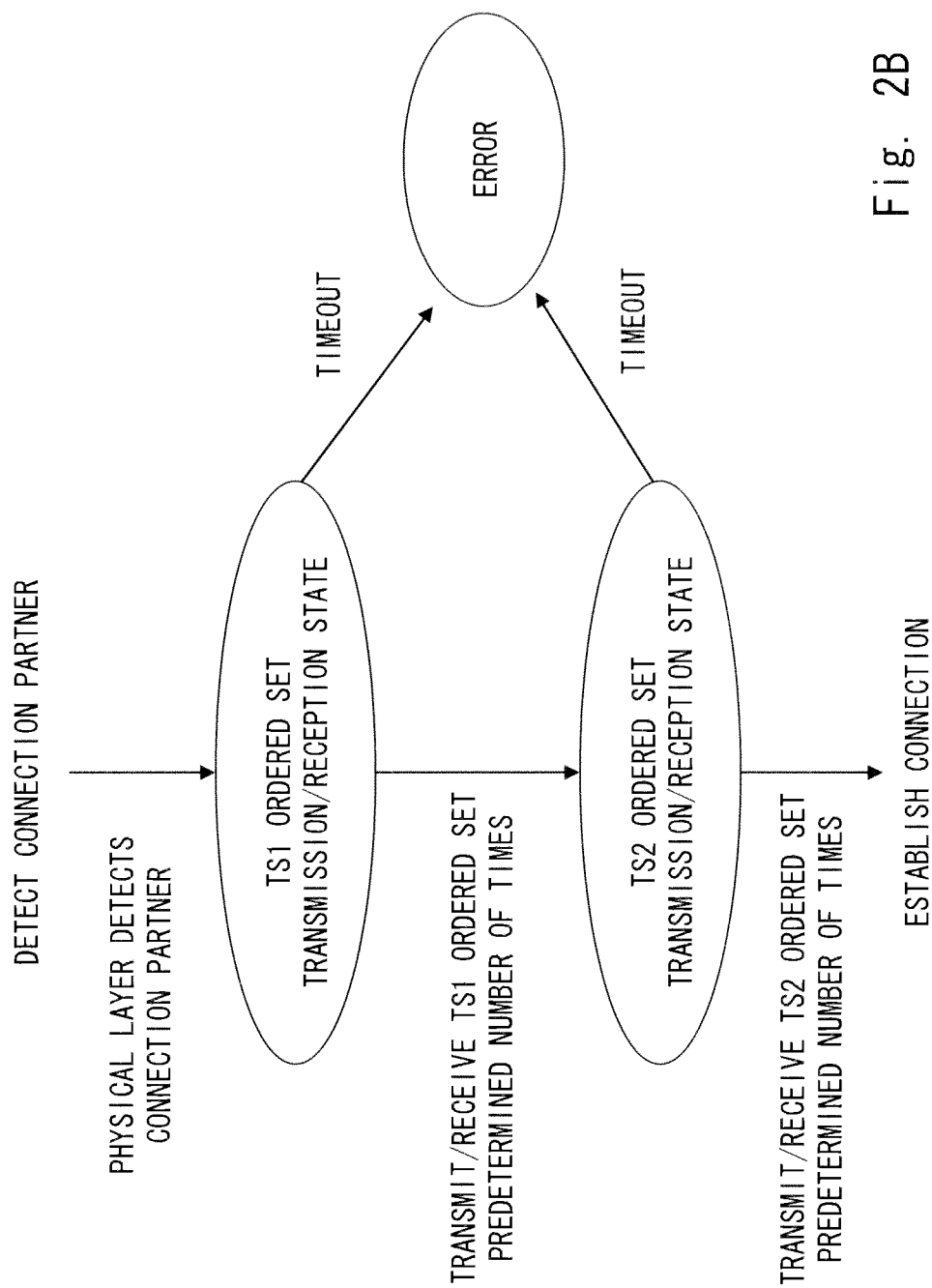
FIG. 2B is a diagram for describing a TSn ordered set (1) and a TSn ordered set (2)

FIG. 2B is a diagram for describing the TSn ordered set (1) and the TSn ordered set (2). As shown in FIG. 2B, there are two kinds of data sets of TS1 Ordered Set and TS2 Ordered Set to establish the connection in the USB 3.0/PCI Express specification. First, a physical layer detects a connection partner, and thereafter, the TS1 Ordered Set is transmitted or received for a predetermined number of times. If it is successful, the TS2 Ordered Set is transmitted/received for a predetermined number of times. If it is successful, the connection is established.

Referring back to FIG. 2A, in the PCI Express, the SKP ordered set including one COM symbol and four SKP symbols (timing adjusting symbols) is inserted in the transmission side, and the number of SKP symbols is increased or decreased in the elastic buffer circuit 7. Further, in the USB 3.0, the SKP ordered set including an even number of SKP symbols is inserted in the transmission side, and the even number of SKP symbols is increased or decreased in the elastic buffer circuit 7. The following description will be made by taking USB 3.0 (TSn ordered set: four COM symbols+12 pieces of data, SKP ordered set: an even number of SKP symbols (including 0)) as an example.

In this example, the data receiving apparatus receives a plurality of TSn ordered sets during the training. As described above, the LFSR of the descrambling circuit 10 is initialized by COM symbols. In summary, in the example shown in FIG. 2, when the TSn ordered set is received, the LFSR is initialized for the first four times.

In this case, as shown in FIG. 28B described above, when the last COM symbol in the last TSn ordered set (2) is corrupted, the LFSR is not initialized but is shifted. In such a case, the subsequent shift timings are deviated, which makes it impossible to associate the descramble processing in the reception side and the scramble processing in the transmission side.

In order to solve this problem, in the first embodiment, the LFSR initialization circuit 9 generates the LFSR initialization signal 12 to initialize the LFSR of the descrambling circuit 10 at the timing at which the last COM symbol is input to the LFSR (hereinafter referred to as an initialization last timing T1). Accordingly, the LFSR of the descrambling circuit 10 is initialized at the initialization last timing T1 by the LFSR initialization signal 12 regardless of whether the COM symbol is normal or corrupted.

When the last COM symbol in the TSn ordered set before the last TSn ordered set is corrupted, the shift timing of the LFSR at the time of reception of data that is received at the following timings is deviated. However, since the LFSR is initialized at least by the COM symbol in the last TSn ordered set (2), the shift timing of the LFSR is returned to the normal timing. Further, since the TSn ordered set is received for a plurality of times, the connection can be established even when a part of the data cannot be received normally.

In the first embodiment, even when the COM symbol in the last TSn ordered set (2) is corrupted, the LFSR initialization signal 12 makes it possible to associate the descramble processing in the reception side with the scramble processing in the transmission side, and to normally decode the following data and receive the data. Accordingly, the connection can be established without re-executing the training.

Hereinafter, the LFSR initialization circuit 9 according to the first embodiment will be described in detail. The LFSR initialization circuit 9 is required to detect at least the initialization last timing T1 in order to generate the LFSR initialization signal 12. The present inventor has found that the initialization last timing T1 can be detected by counting the number corresponding to the number of symbols or pieces of data included in the TSn ordered set determined by the specification of the high-speed serial communication. In summary, during the training, if at least one TSn ordered set can be normally received, the reception start timings of the following TSn ordered sets can be detected, and thus the reception start timing of the last TSn ordered set (2) can be detected as well. When the reception start timing of the TSn ordered set (2) can be detected, the reception timing of the last COM symbol of the COM symbols forming the TSn ordered set (2) can also be detected since the number of COM symbols forming the TSn ordered set (2) is determined according to the specification. Thus, it is possible to generate the LFSR initialization signal 12 at the initialization last timing T1. In short, the initialization last timing T1 is detected by counting the number corresponding to the number of symbols or pieces of data included in the TSn ordered set determined by the specification of the high-speed serial communication.

In the first embodiment, it is assumed that the LFSR initialization signal 12 initializes the LFSR always in a high level not only at the initialization last timing T1 but also during a period in which the COM symbols are received.

Needless to say, it is sufficient that the LFSR initialization signal 12 is in a high level at least at the initialization last timing T1.

Figure 3:
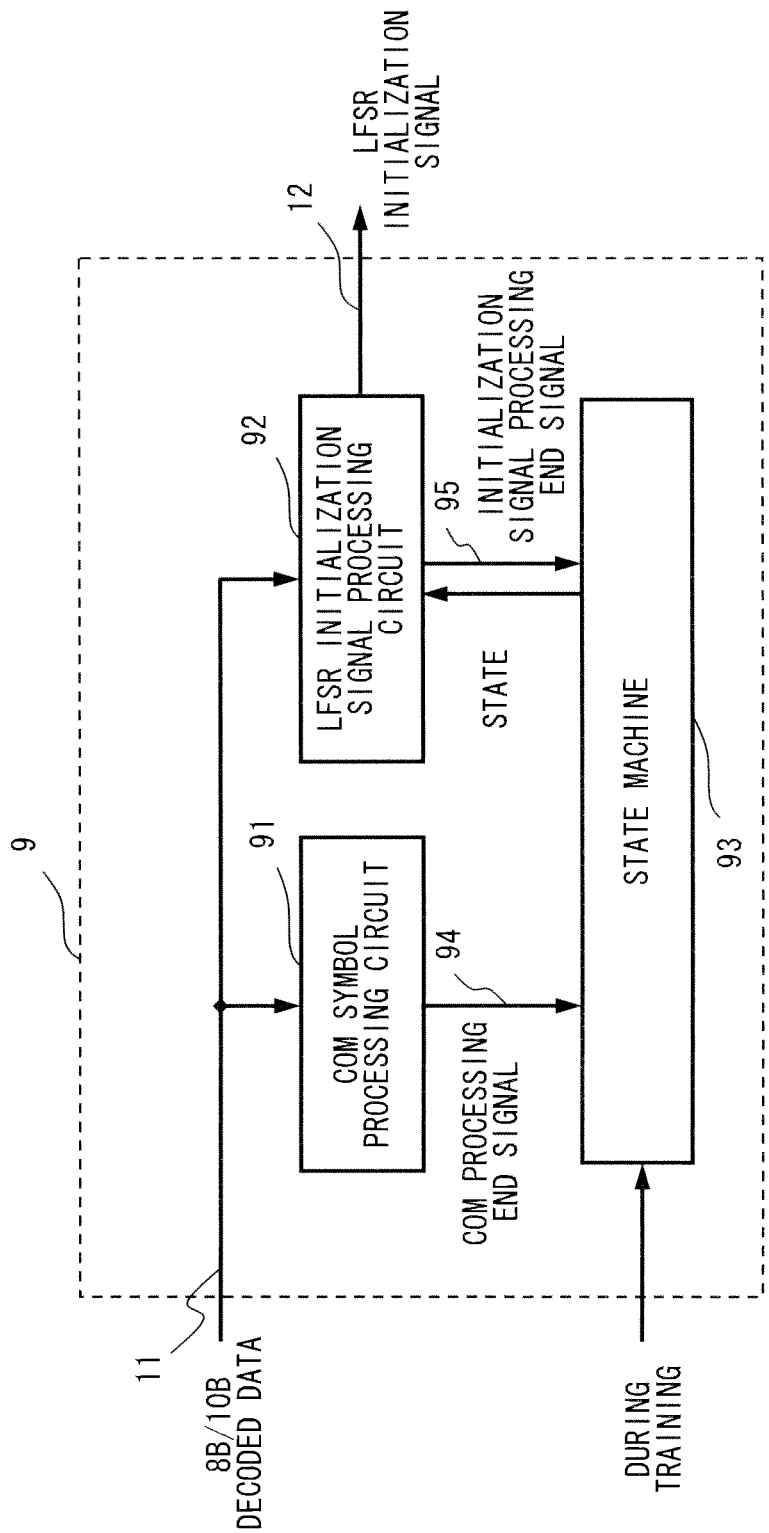
FIG. 3 is a block diagram showing detail of an LFSR initialization circuit according to the first embodiment of the present invention.

FIG. 3 is a block diagram showing detail of the LFSR initialization circuit 9 according to the first embodiment. In order to detect the initialization last timing T1, the LFSR initialization circuit 9 according to the first embodiment includes a COM symbol processing circuit 91, an LFSR initialization signal processing circuit 92, and a state machine 93. The COM symbol processing circuit 91 receives the 8B/10B decoded data 11, detects that it normally received the COM symbols of the TSn ordered set first during the training, and outputs a COM processing end signal to the state machine 93 after the detection. The LFSR initialization signal processing circuit 92 also receives the 8B/10B decoded data 11, and receives states from the state machine 93. Then, the LFSR initialization signal processing circuit 92 continues the processing to generate the LFSR initialization signal 12 at predetermined cycles after the start timing of the TSn ordered set is detected (after COM processing is ended) until when the LFSR initialization signal processing is ended. After generating the LFSR initialization signal 12, the LFSR initialization signal processing circuit 92 outputs an initialization signal processing end signal to the state machine 93. The state machine 93 receives a signal indicating "training period" from an external existing circuit, determines the state regarding whether the training is being performed, and outputs the result to the LFSR initialization signal processing circuit 92.

This LFSR initialization circuit 9 detects the initialization last timing T1 by counting the number corresponding to the number of symbols or pieces of data included in the TSn ordered set determined by the specification of the high-speed serial communication, and generates the LFSR initialization signal 12 based on the detection result.

The number corresponding to the number of symbols or pieces of data included in the TSn data set determined by the specification of the high-speed serial communication means a common factor (Z is an integer of two or larger) of the number of COM symbols and the number of pieces of data other than the COM symbols forming the TSn ordered set, and the number of symbols forming the SKP ordered set.

As described above, in the first embodiment, the number of COM symbols included in the TSn ordered set is four, the number of pieces of data included in the TSn ordered set is 12, and the SKP ordered set includes an even number (including 0) of SKP symbols. After receiving the four COM symbols, the number of pieces of data remaining in the TSn ordered set is 12. After that, the TSn ordered set includes 16 symbols or data, and the SKP ordered set always includes an even number of symbols. Accordingly, it is found that all the data after receiving the four COM symbols are always equal to a multiple of the common factor Z=2 of the number of COM symbols and the number of pieces of data other than the COM symbols forming the TSn ordered set, and the number of symbols forming the SKP ordered set.

When there is a common factor Z of the number of COM symbols and the number of pieces of data other than the COM symbols forming the TSn ordered set, and the number of symbols forming the SKP ordered set, the initialization last timing T1 can be detected by counting the common factor Z after the COM symbols corresponding to the number specified by the specification are normally received first. Specifically, the COM symbols are normally received first. Then, the LFSR initialization signal 12 is generated (high level) at a timing at which the count reaches the count Z after the timing at which the COM symbols are received next, whereby the LFSR can be definitely initialized at the initialization last timing T1. In short, as shown in FIG. 2, even when the last COM symbol in the last TSn ordered set (2) is corrupted, the LFSR can be initialized by the LFSR initialization signal 12.

Figure 4:
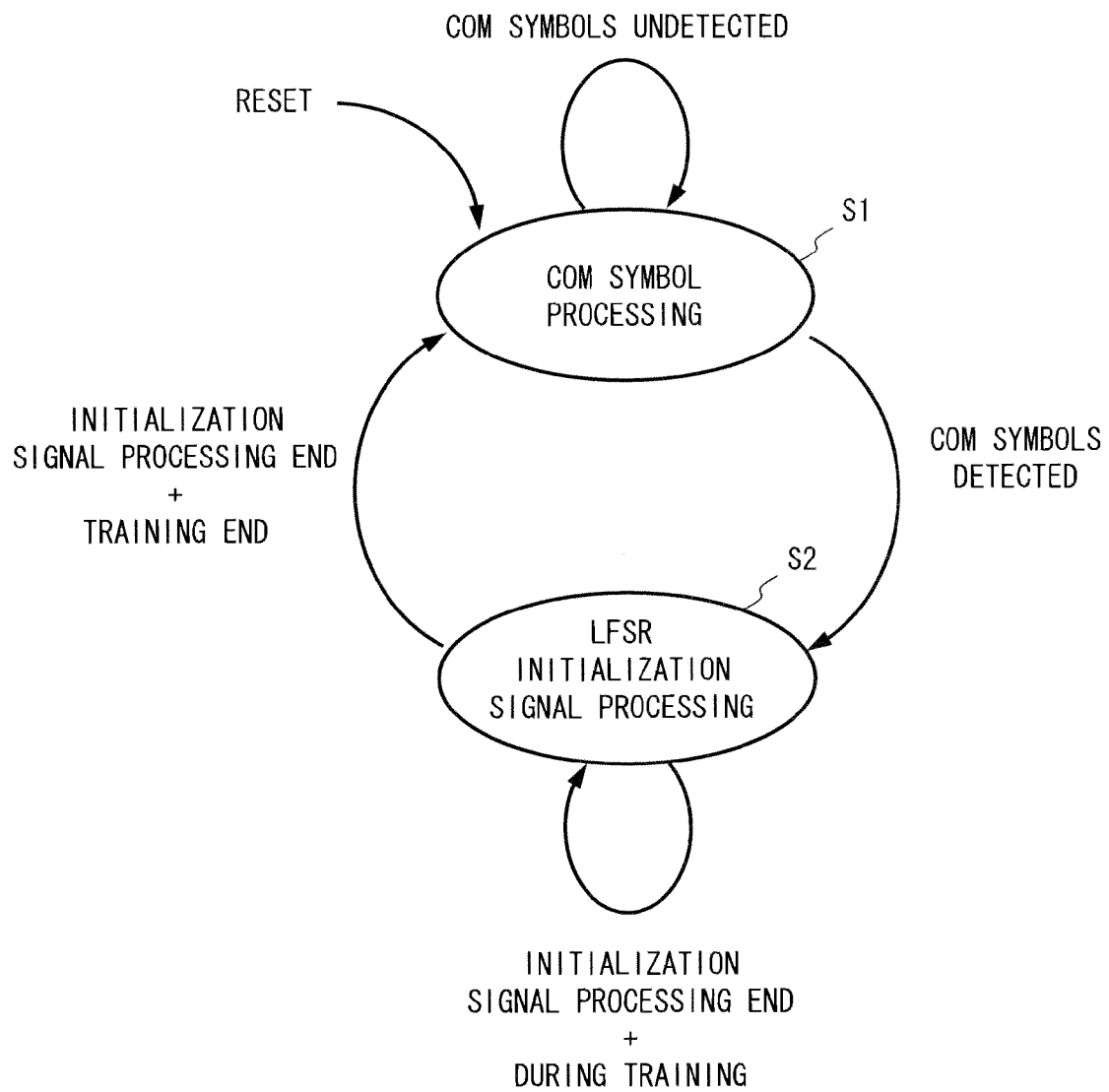
FIG. 4 is a diagram for describing states of a state machine according to the first embodiment of the present invention.

FIG. 4 is a diagram for describing states in the state machine 93. As shown in FIG. 4, the state machine 93 includes two states of COM symbol processing S1 and LFSR initialization signal processing S2. The state is the COM symbol processing S1 until when four COM symbols are received first. Then, when four COM symbols are normally received (when the COM symbols are detected), the state transits to the LFSR initialization signal processing S2. The state machine 93 receives the initialization signal processing end signal from the LFSR initialization signal processing circuit 92. However, the state machine 93 maintains the state of the LFSR initialization signal processing S2 during the training. When the state machine 93 receives the initialization signal processing end signal and receives the training end signal, the state transits to the state of the COM symbol processing S1.

Figure 5:
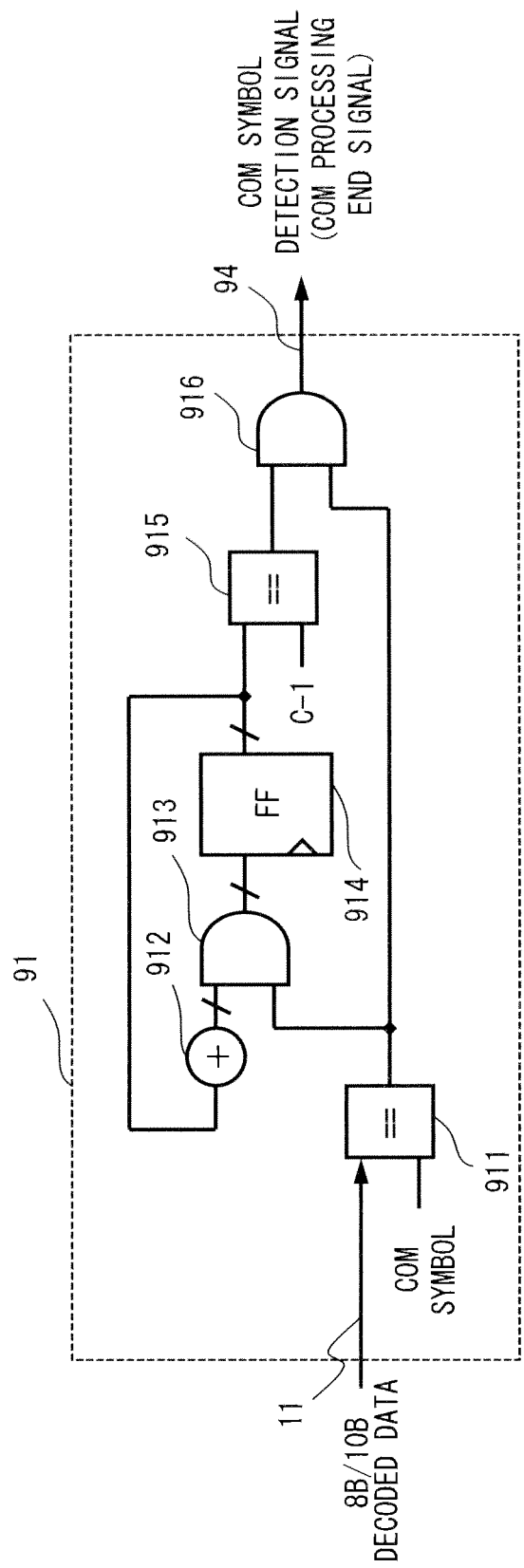
FIG. 5 is a circuit diagram showing one example of detail of a COM symbol processing circuit of the LFSR initialization circuit according to the first embodiment of the present invention.
Figure 6:
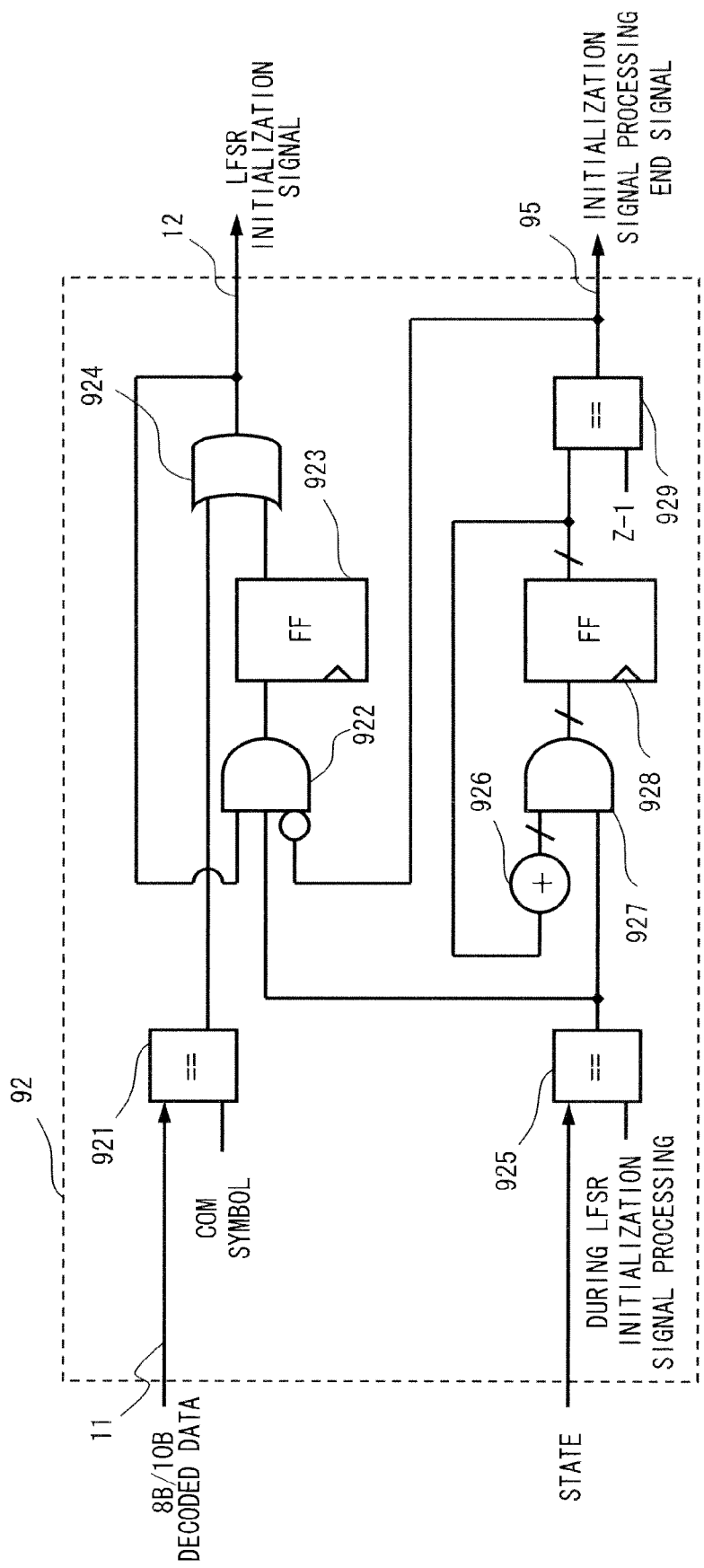
FIG. 6 is a circuit diagram showing one example of detail of an LFSR initialization signal processing circuit of the LFSR initialization circuit according to the first embodiment of the present invention.

FIG. 5 and FIG. 6 are circuit diagrams showing one example of detail of the COM symbol processing circuit 91 and the LFSR initialization signal processing circuit 92, respectively. As shown in FIG. 5, the COM symbol processing circuit 91 includes a comparator 911, an adder 912, a multi-bit AND circuit 913, a register (F/F) 914, a comparator 915, and an AND circuit 916. The comparator 911 determines whether the 8B/10B decoded data 11 is a COM symbol. The F/F 914 stores the number of COM symbols. The comparator 915 determines whether the number of COM symbols coincides with the number C specified by the specification (in the first embodiment, C=4). The AND circuit 916 outputs the logical AND of the outputs of the comparator 911 and the comparator 915. The adder 912, the multi-bit AND circuit 913, and the F/F 914 form a COM counter that counts up from 0 to C−1.

When it is detected by the comparator 911 that the 8B/10B decoded data 11 is a COM symbol, 1 is output to the AND circuit 913. The adder 912 increments the value stored in the F/F 914, and outputs the value of 1 to the F/F 914 when 1 is output from the comparator 911. In this way, the values stored in the F/F 914 are counted up while the COM symbols are continuously detected. When it is determined by the comparator 915 that this value coincides with C−1, it means that all the symbols from 0 to (C−2)-th symbols are COM symbols. When the last (C−1)-th symbol is a COM symbol, the output of the AND circuit 916 becomes 1. In this case, it is determined that C COM symbols have been detected, and the COM symbol detection signal (COM processing end signal 94) is output. When it is detected by the AND circuit 916 that the (C−1)-th symbol is not a COM symbol, the COM symbol detection signal is masked.

As shown in FIG. 6, the LFSR initialization signal processing circuit 92 includes a comparator 921, an AND circuit 922, a flip-flop F/F 923, an OR circuit 924, a comparator 925, an adder 926, a multi-bit AND circuit 927, an F/F 928, and a comparator 929. The comparator 921 determines whether the 8B/10B decoded data 11 is a COM symbol. The comparator 925 determines whether the state shows the LFSR initialization signal processing, and outputs the signal to initialize the LFSR. The comparator 929 determines whether the counter value of the initialization counter is Z−1, and outputs an initialization signal processing end signal 95. The adder 926, and the multi-bit AND circuit 927, and the F/F 928 form an initialization counter that counts up from 0 to Z−1.

When the COM symbol is input from the 8B/10B decoded data 11, 1 is output from the comparator 921. Accordingly, 1 is output from the OR 924, and the LFSR initialization signal 12 is output. Specifically, the LFSR initialization signal 12 is output while the COM symbols are detected. Further, during the LFSR initialization signal processing, the comparator 925 outputs 1, which is then input to the AND 922. The comparator 929 outputs 0 until when the value (count value) of the F/F 928 becomes Z−1, which is then inverted and supplied to the AND 922. Accordingly, until when the Z-th COM symbol is detected (in the first embodiment, until when the count value reaches Z−1 since the count starts from 0), the output of the AND 922 is 1, and so is the output of the F/F 923, and the value of 1 is supplied to the OR 924. In summary, even when the COM symbol is not detected, the LFSR initialization signal 12 is output until when the count value reaches Z−1.

The LFSR initialization signal processing circuit 92 thus formed repeatedly counts the initialization counter, detects the COM symbols included in the 8B/10B decoded data 11, and outputs the LFSR initialization signal 12 while the COM symbols are detected or from when the COM symbol is detected to when the Z-th symbol is detected (the LFSR initialization signal 12 becomes 1).

In summary, when the Z-th symbol is detected when the COM symbol is detected, the LFSR initialization signal 12 that initializes the LFSR can be generated at least at this timing. When the detected symbol when the COM symbol is detected is less than the Z-th symbol, the LFSR initialization signal 12 can be generated at a timing (first initialization timing). The first initialization timing is a timing at which a timing for receiving the Z-th symbol first (the counter value in the first embodiment is Z−1) reaches a predetermined number of times. In short, the LFSR initialization signal 12 can be generated at least at the initialization last timing T1.

It is noted that the input of the OR 924 becomes 0 and the LFSR initialization signal 12 becomes 0 when the reception of the COM symbol is stopped.

Figure 7:
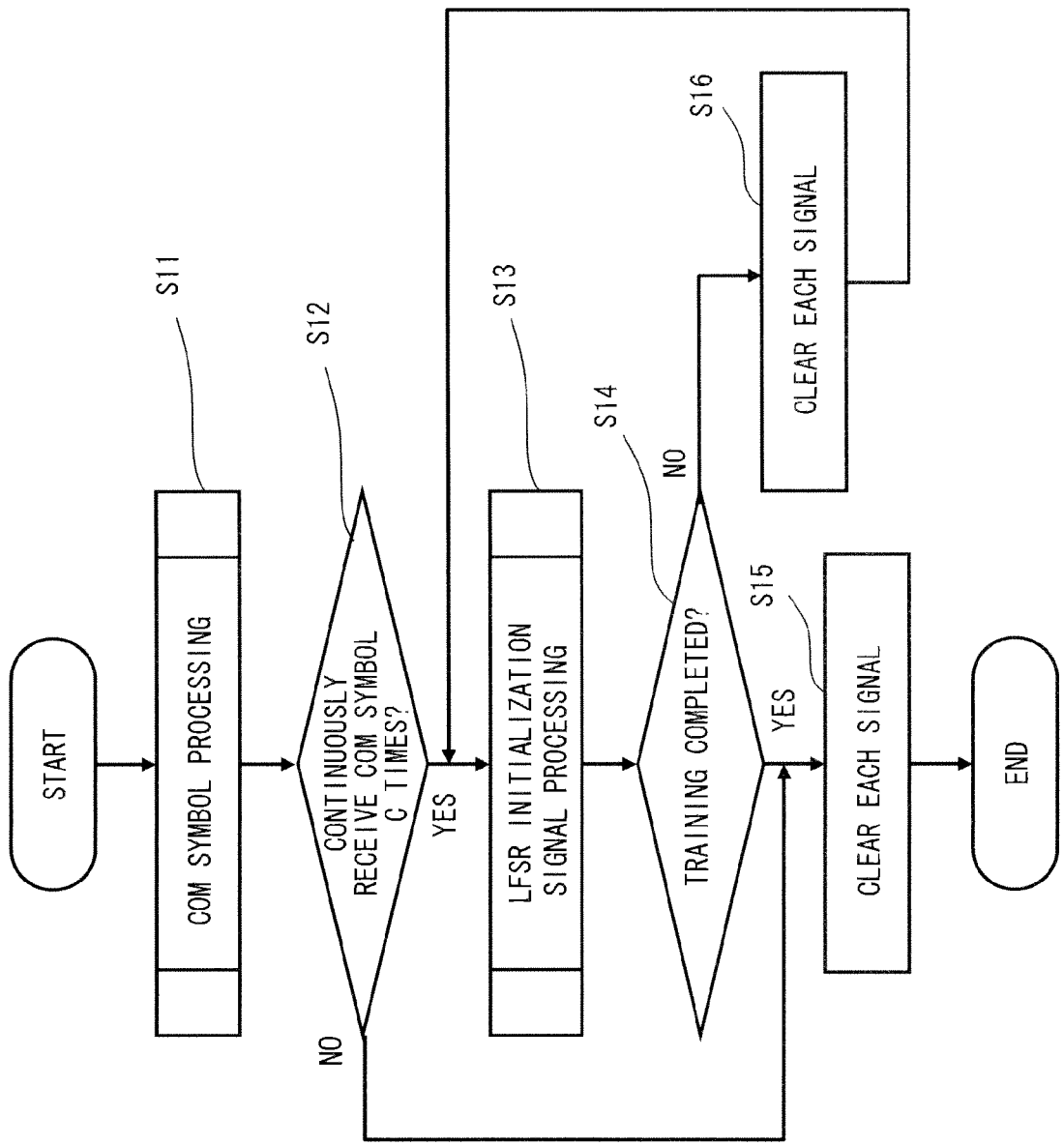
FIG. 7 is a flow chart showing an operation of the LFSR initialization circuit in the data receiving apparatus according to the first embodiment of the present invention.
Figure 8:
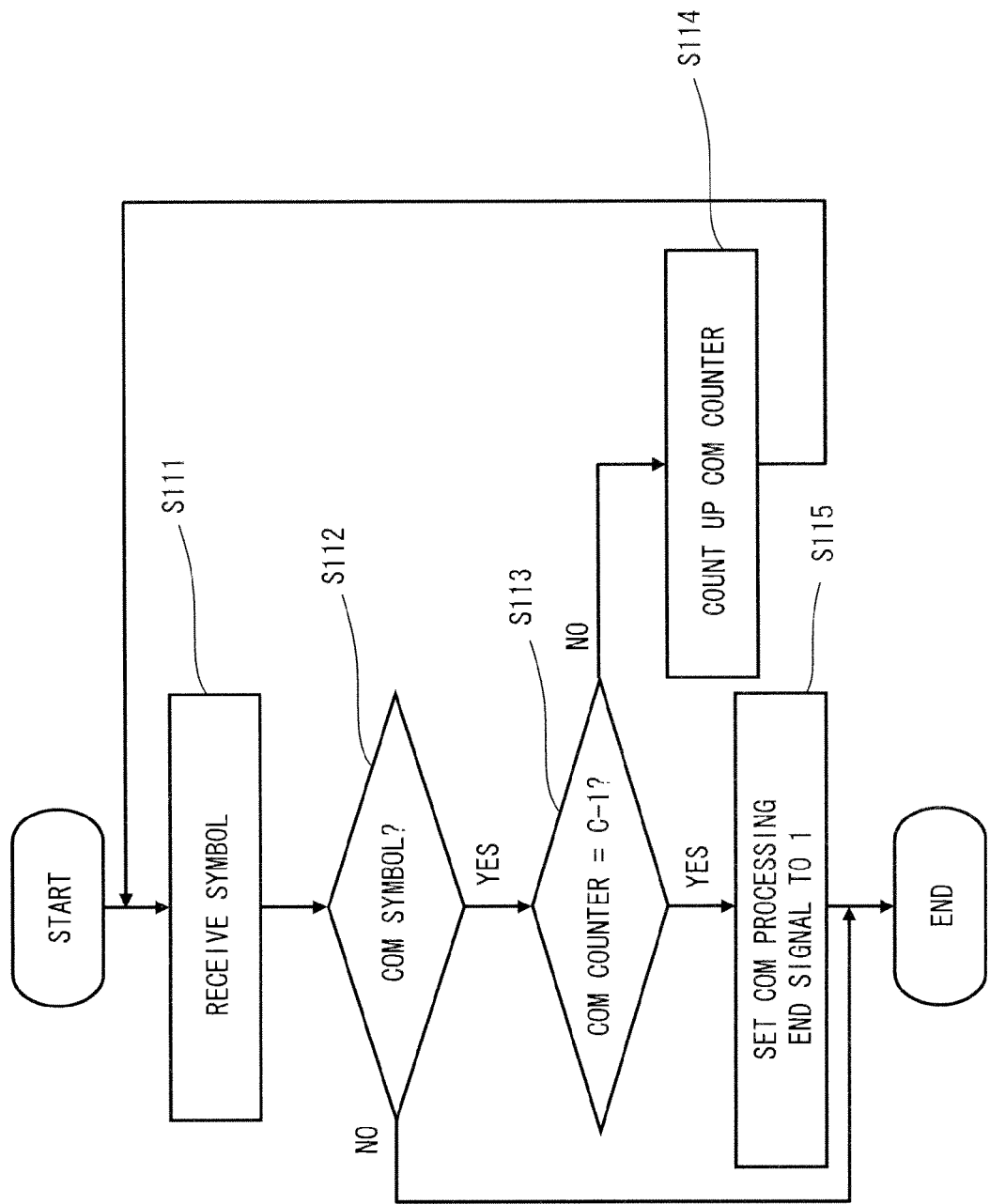
FIG. 8 is a flow chart showing detail of COM symbol processing of the LFSR initialization circuit in the data receiving apparatus according to the first embodiment of the present invention.
Figure 9:
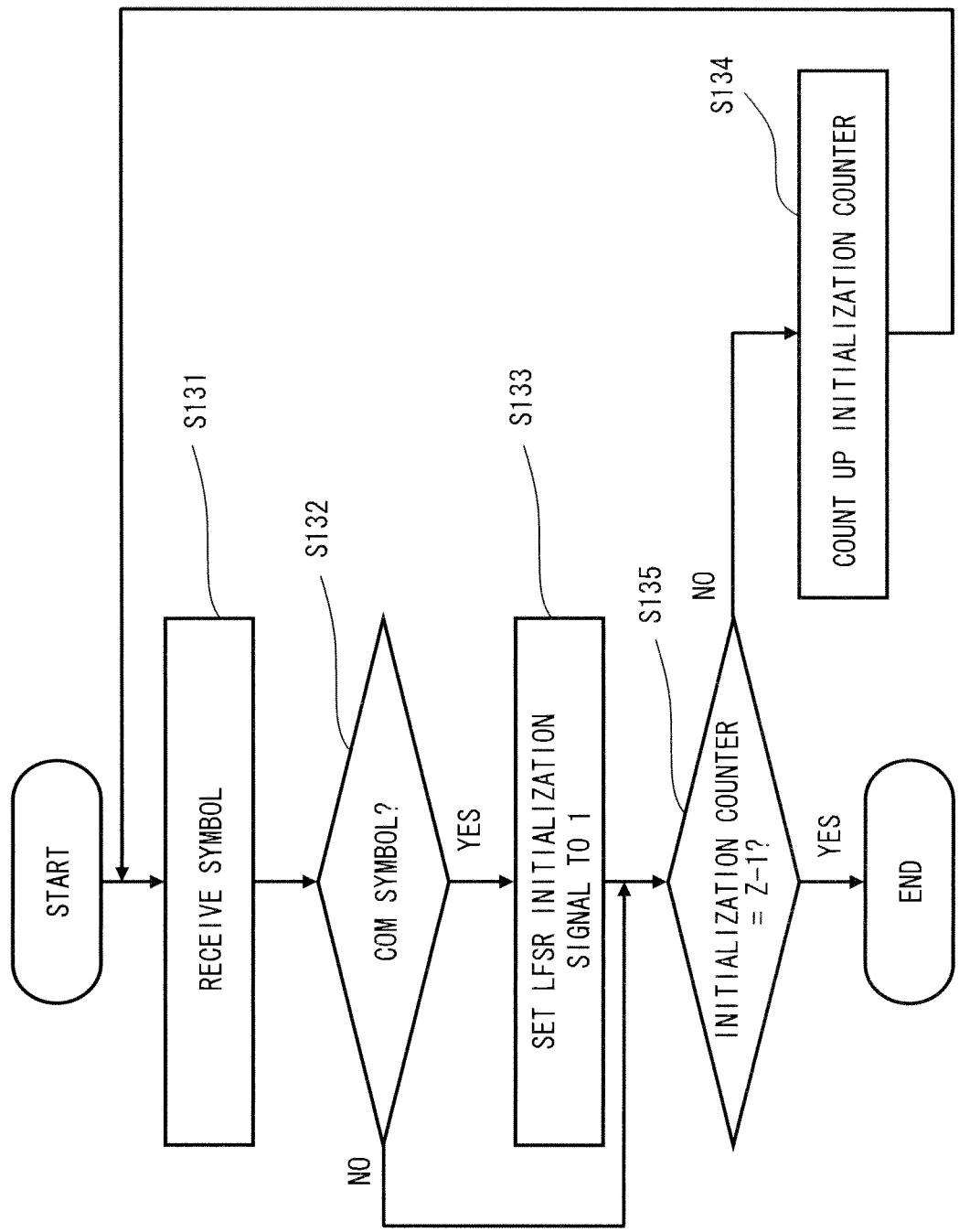
FIG. 9 is a flow chart showing detail of LFSR initialization signal processing of the LFSR initialization circuit in the data receiving apparatus according to the first embodiment of the present invention.

Next, an operation of the LFSR initialization circuit 9 according to the first embodiment will be described. FIG. 7 is a flow chart showing an operation of the LFSR initialization circuit 9 in the data receiving apparatus according to the first embodiment, and FIGS. 8 and 9 are flow charts showing detail of the COM symbol processing and the LFSR initialization signal processing, respectively.

As shown in FIG. 7, the LFSR initialization circuit 9 executes the COM symbol processing (step S11) to detect a predetermined number C of COM symbols included in the TSn ordered set included in the training data set. When the C COM symbols are continuously received at step S12, or when the COM symbol processing is successfully performed, the process proceeds to step S13. In other periods than the training, C COM symbols are not received in the COM symbol processing S11 (step S12: No). In this case, each signal generated by the LFSR initialization circuit 9 is cleared (step S15), and then the processing is ended.

When C COM symbols are continuously detected, the process proceeds to step S13, where the LFSR initialization signal processing S13 is executed. The LFSR initialization signal processing S13 is continued until when it is determined that the training is completed (step S14: Yes) while clearing each signal generated by the LFSR initialization circuit 9 including the LFSR initialization signal 12 (step S16).

Next, the COM symbol processing of S12 will be described. As shown in FIG. 8, first, a symbol is received (step S111). Then, it is determined whether the symbol is a COM symbol (step S112). When the received symbol is not a COM symbol, the processing is ended. When the received symbol is a COM symbol (step S112: Yes), it is determined whether the value of the COM counter, or the value of the F/F 914 in the example of FIG. 5 described above is C−1 (step S113). The COM counter is counted up until when the counter value reaches C−1 (step S114). When the counter value reaches C−1, it is determined that the C COM symbols have been detected. Then, the COM processing end signal 95 is set to 1 (step S115), and then the processing is ended.

Next, the LFSR initialization signal processing in S13 will be described. As shown in FIG. 9, when a symbol is received (step S131), it is determined whether the symbol is a COM symbol (step S132). When the received symbol is a COM symbol, the LFSR initialization signal is set to 1 (step S133). The initialization counter is counted up regardless of whether the symbol is the COM symbol (step S134), and the processing from step S131 is repeated until when the initialization counter becomes Z−1 (step S135). The processing is ended when the count value of the initialization counter reaches Z−1.

Figure 10:
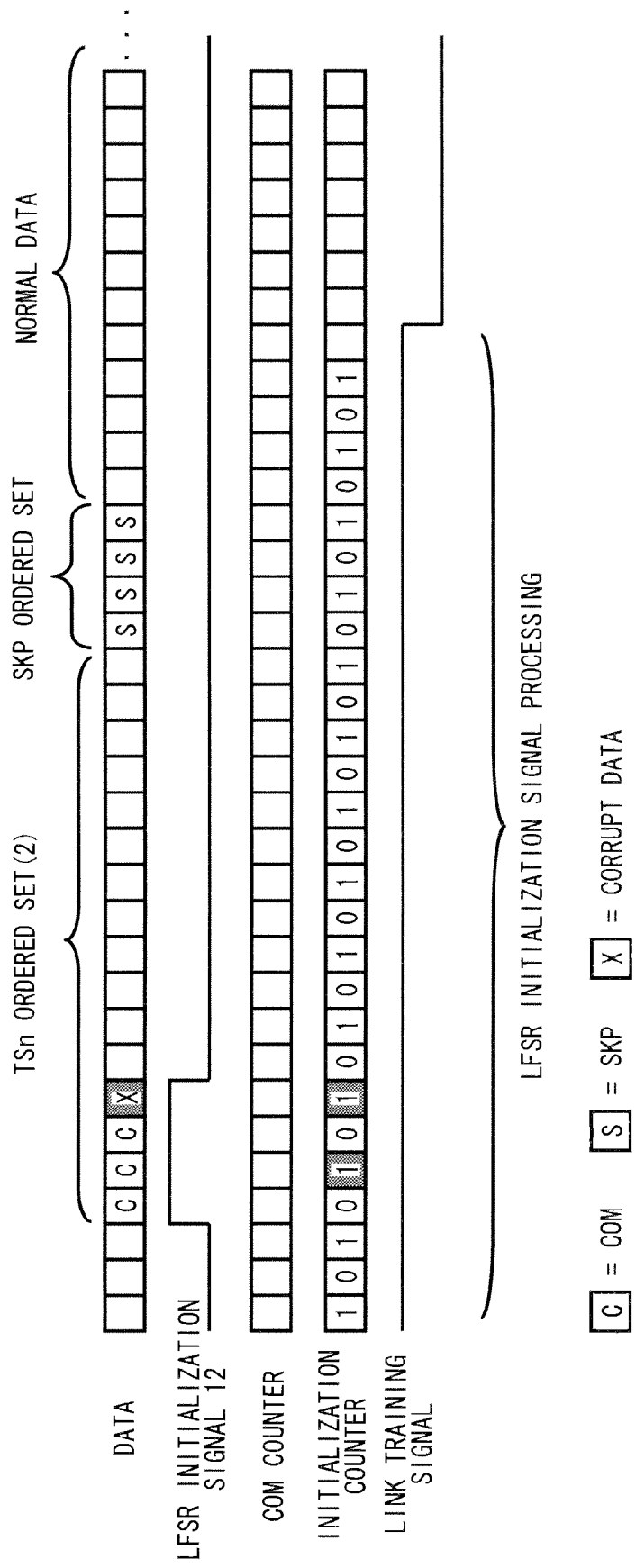
FIG. 10 is a diagram for describing signals generated by the LFSR initialization circuit according to the first embodiment of the present invention.

FIGS. 2A and 10 are diagrams for describing signals generated by the LFSR initialization circuit 9 according to the first embodiment. As shown in FIG. 2A, the COM symbol processing is ended when the four (C) COM symbols are normally detected first, and the LFSR initialization signal processing is executed in the following processing. As shown in FIGS. 2A and 10, while the LFSR initialization signal processing is performed, the initialization counter repeatedly counts 0 to Z−1 (1 in the first embodiment). When the COM symbol is input, the LFSR initialization signal 12 becomes 1. Accordingly, even when the last fourth COM symbol in the last TSn ordered set (2) included in the training data set is corrupted, the LFSR initialization signal 12 is 1 until when the initialization counter reaches Z−1, whereby the LFSR can be reset. The LFSR initialization signal processing is ended when the training signal becomes low.

Figure 11A:
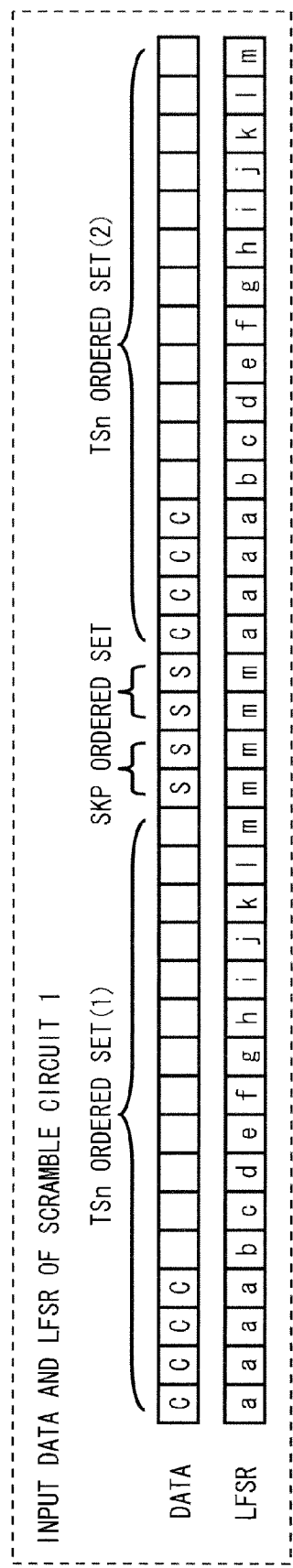
FIG. 11A is a diagram for describing data and an LFSR in a transmission side according to the first embodiment of the present invention.

In FIG. 11A, data is input data of the scrambling circuit 1 which is a transmission side, and an LFSR is a timing chart of an internal signal (showing a state of the scrambler) of the scrambling circuit 1.

Figure 11B:
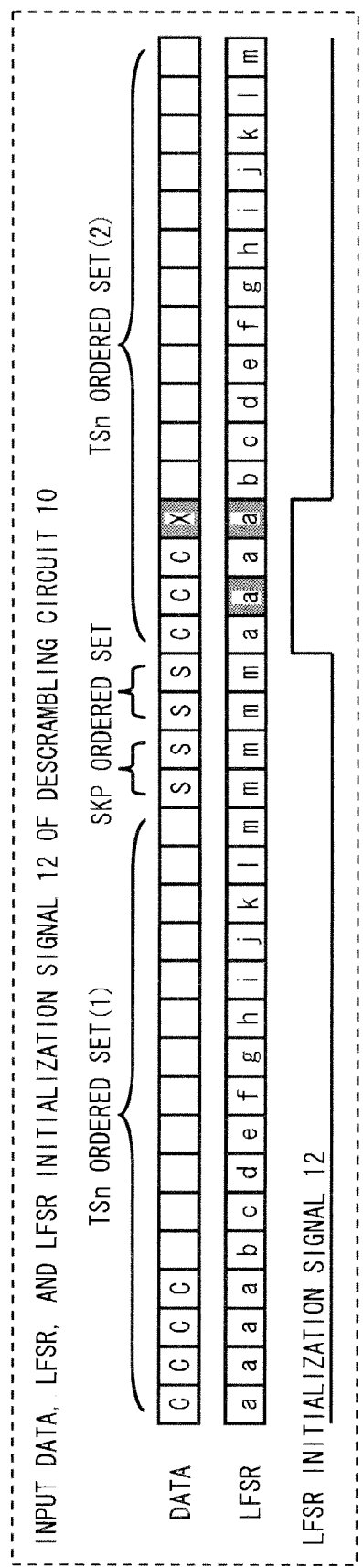
FIG. 11B is a diagram for describing data, an LFSR, and an initialization signal in a reception side according to the first embodiment of the present invention.

In FIG. 11B, data is input data (8B/10B decoded data 11) of the descrambling circuit 10 which is a reception side, an LFSR is an internal signal of the descrambling circuit 10 (showing a state of the descrambler), and the LFSR initialization signal 12 is a signal to reset the descrambler.

As shown in FIG. 11A, the LFSR is reset in the COM symbols (state a), and shifting of the LFSR is stopped in the SKP symbols and is performed in the data part. When a COM symbol of the last TSn ordered set (2) is corrupted, the LFSR is not reset in the related art. However, as shown in FIG. 11B, in the first embodiment, the LFSR is reset by the LFSR initialization signal 12. Accordingly, even when the COM symbol is corrupted, the LFSR can be normally reset.

Second Embodiment of the Present Invention

Next, a second embodiment of the present invention will be described. The first embodiment described above may be applied to a case in which there is a common factor Z of the number of COM symbols and the number of pieces of data other than the COM symbols forming the TSn ordered set, and the number of symbols forming the SKP ordered set. Here, in PCI Express, for example, an SKP ordered set including one COM symbol and four SKP symbols (timing adjusting symbols) is inserted in the transmission side, and the number of SKP symbols is increased or decreased in the elastic buffer circuit 7 in the reception side. In summary, the number of symbols (data) forming the SKP ordered set may be 4, 5, or 6 according to the reception state. The number of symbols may be other number than 4 to 6. While the number of SKP symbols is increased or decreased according to the reception state also in USB 3.0, it is increased or decreased so that the number always becomes a multiple of 2. Thus, the common factor Z is determined to be 2 as described above. Further, in the PCI Express, the number of COM symbols C forming the TSn ordered set is 1.

When the number of symbols of the SKP ordered set is increased or decreased according to the reception state, or when the number of COM symbols forming the TSn ordered set is 1, the common factor Z cannot be specified, or there is no common factor Z that is larger than 1. However, the number of symbols or the number of pieces of data included in the TSn data set and the SKP data set is determined according to the specification and the reception state of the high-speed serial communication. Therefore, in the second embodiment, the initialization last timing T1 is detected by counting the number of symbols or the number of pieces of data included in the TSn data set and the SKP data set determined according to the specification and the reception state of the high-speed serial communication, and the initialization signal is generated based on the detection result.

More specifically, after the COM symbol processing described above is performed, the TSn ordered set processing that counts the number of pieces of data other than the COM symbol in the TSn ordered set, the SKP ordered set processing that counts the number of symbols of the SKP ordered set, and the LFSR initialization signal processing that generates the LFSR initialization signal based on these results are executed. Accordingly, even when the common factor Z does not exist, it is possible to perform normal decoding by matching the timings of scrambling and descrambling in the transmission side and the reception side. The second embodiment will be described by taking the USB 3.0 as an example, as is similar to the first embodiment. Specifically, in the second exemplary example, the number of COM symbols C included in the TSn ordered set is 4, the number of pieces of data M included in the TSn ordered set is 12, and the number of symbols K included in the SKP ordered set is an even number.

Figure 12:
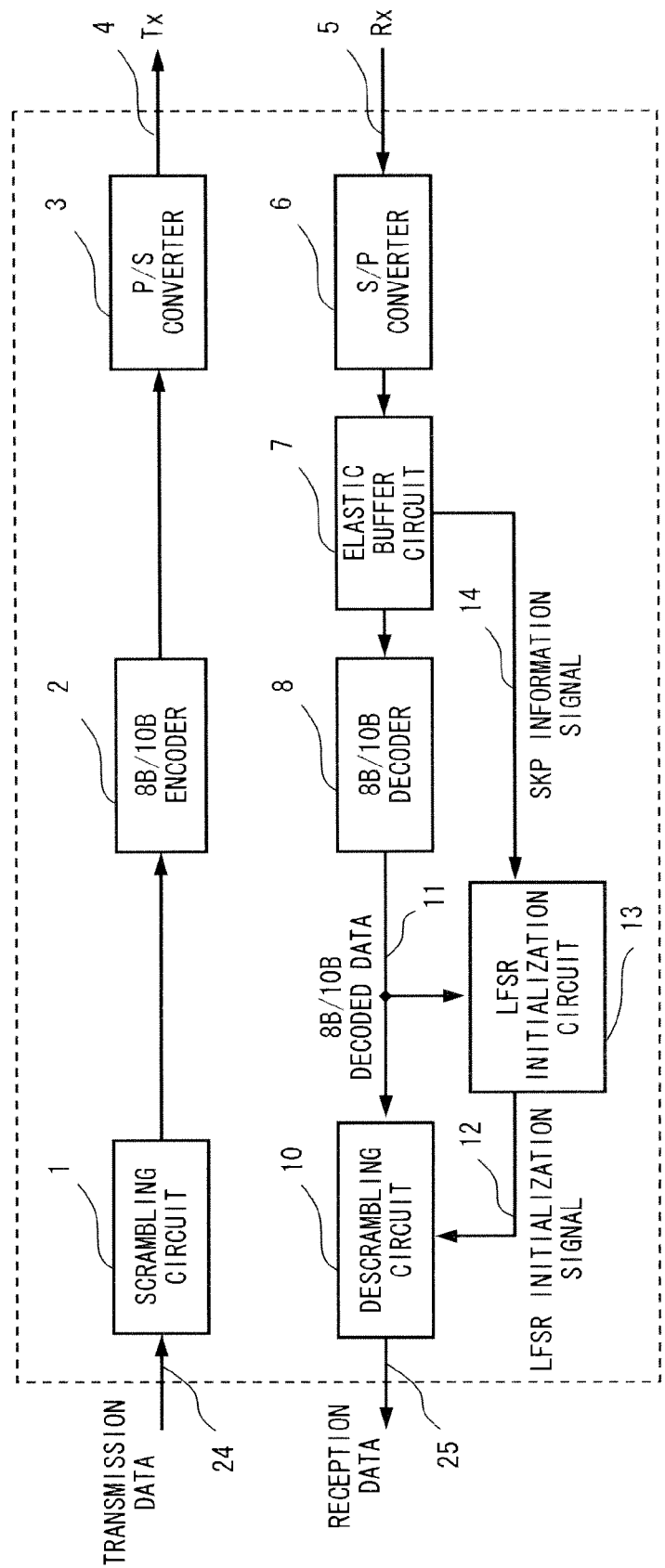
FIG. 12 is a block diagram showing a data transfer apparatus according to a second embodiment of the present invention.

FIG. 12 is a block diagram showing a data transfer apparatus according to the second embodiment. An LFSR initialization circuit 13 according to the second embodiment receives an SKP information signal 14 output from an elastic buffer circuit 7. Namely, in the elastic buffer circuit 7, the number of SKP symbols included in the SKP ordered set is increased or decreased. The information of the number is transmitted to the LFSR initialization circuit 13 as the SKP information signal 14. The LFSR initialization circuit 13 performs SKP ordered set processing based on the SKP information signal 14.

Figure 13:
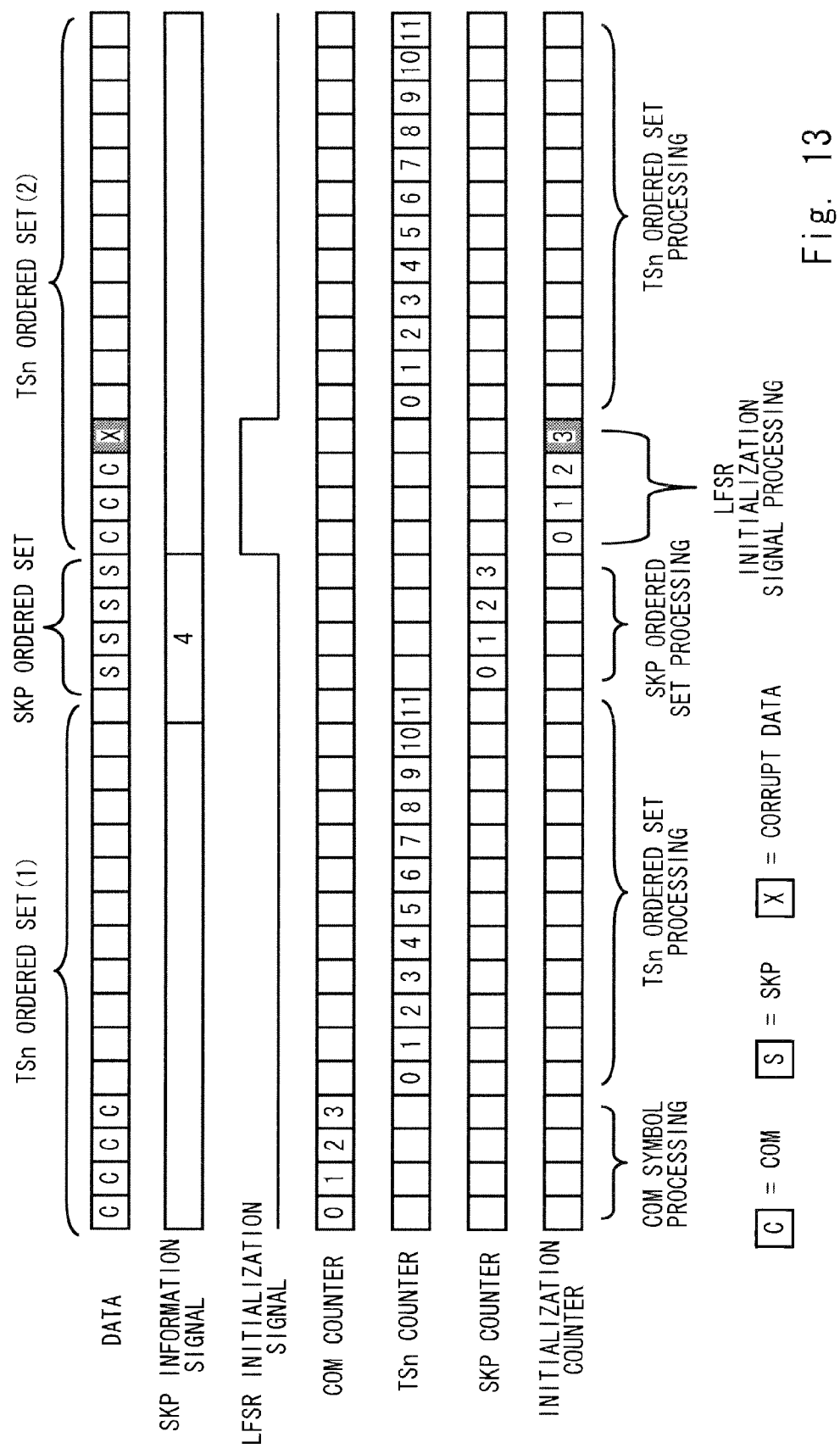
FIG. 13 is a diagram for describing each processing of the data transfer apparatus according to the second embodiment of the present invention.

FIG. 13 is a diagram for describing each processing in the second embodiment. As described below, the LFSR initialization circuit 13 includes a COM counter as a first counter, a TSn counter as a second counter, an SKP counter as a third counter, and an initialization counter as a fourth counter, which count the number of COM symbols, the number of pieces of data included in the TSn ordered set, the number of symbols included in the SKP ordered set, and the number of COM symbols input after COM symbol processing, respectively. Note that the first counter and the fourth counter can be combined.

In FIG. 13, the data is 8B/10B decoded data 11 which is the signal output from an 8B/10B decoder 8, and an SKP information signal is the SKP information signal 14 which is the signal output from the elastic buffer circuit 7. The signal C in the data denotes a COM symbol, S denotes an SKP symbol, and X denotes CORRUPT DATA.

The internal signals generated by the LFSR initialization circuit 13 include an LFSR initialization signal 12, an output from the COM counter, an output from the TSn counter, an output from the SKP counter, and an output from the initialization counter. In the second embodiment, the LFSR initialization signal 12 is generated using the SKP information signal 14, and the count value of each counter.

While detail will be described later, the COM symbol processing is performed by the similar method as in the first embodiment. Specifically, when the training is started, four COM symbols included in the TSn ordered set forming the training data set is detected first. Once four COM symbols are normally received, the TSn ordered set processing and the SKP ordered set processing are executed in the following processing to count the number of symbols or the number of pieces of data.

The LFSR initialization signal processing is started after the TSn ordered set processing and the SKP ordered set processing are performed. At this time, during the reception corresponding to the number of COM symbols, i.e., four symbols, the LFSR initialization signal 12 is set to 1 to initialize the LFSR. After the COM symbol is received, the TSn ordered set processing and the SKP ordered set processing are started again. Then, the LFSR initialization signal processing is executed until when the last TSn ordered set is received to continue generating the LFSR initialization signal 12.

The second embodiment is also described by taking the case as an example where the LFSR initialization signal 12 is always set to 1 while the COM symbols are received. However, needless to say, it is sufficient that the LFSR initialization signal 12 is set to 1 at least at the timing at which the last COM symbol is input to the descrambling circuit 10. Hereinafter, the second embodiment will be described in detail.

Figure 14:
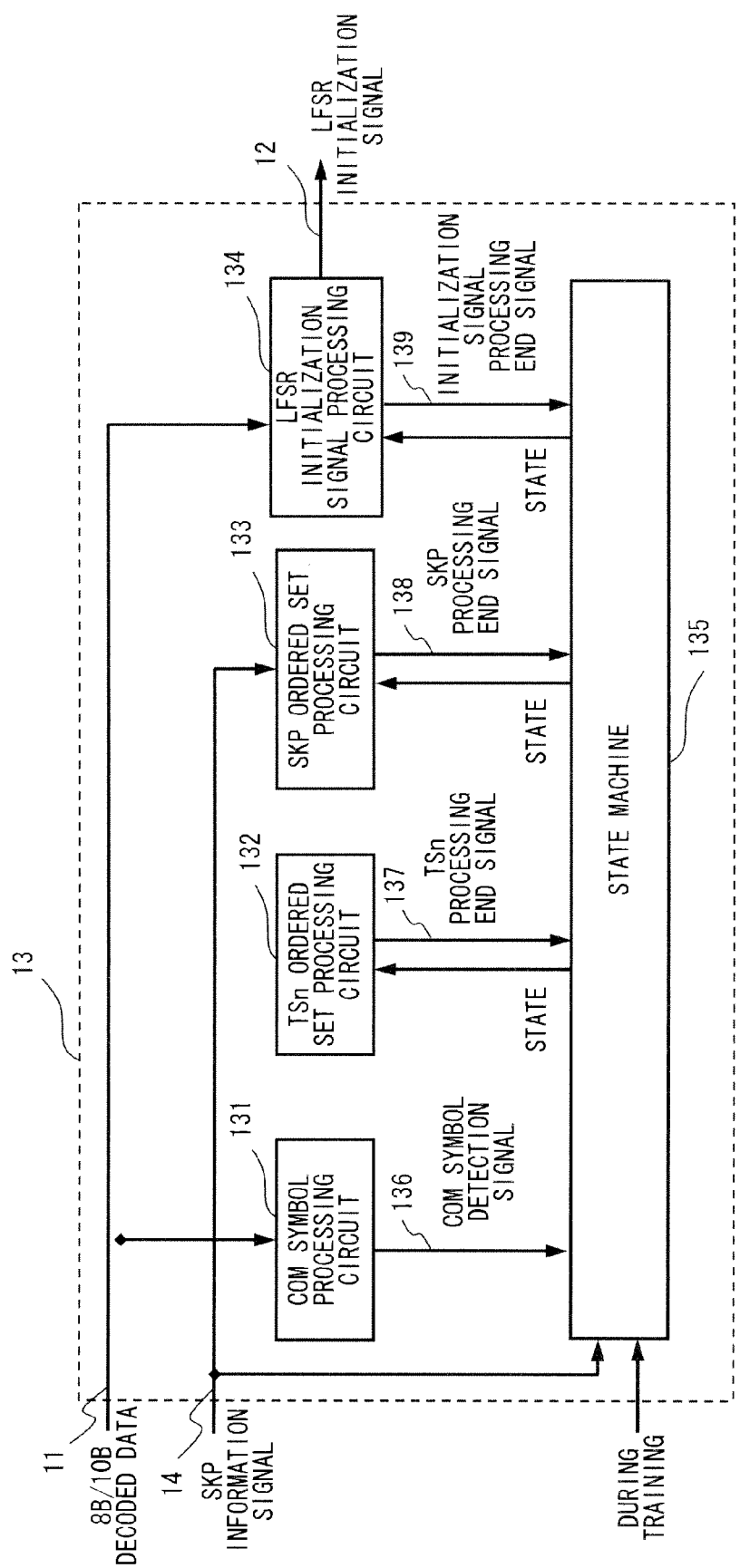
FIG. 14 is a block diagram showing detail of an LFSR initialization circuit in the data transfer apparatus according to the second embodiment of the present invention.

FIG. 14 is a block diagram showing detail of the LFSR initialization circuit 13 according to the second embodiment of the present invention. The LFSR initialization circuit 13 includes a COM symbol processing circuit 131 including a COM counter, a TSn ordered set processing circuit 132 including a TSn counter, an SKP ordered set processing circuit 133 including an SKP counter, an LFSR initialization signal processing circuit 134 including an initialization counter, and a state machine 135.

The COM symbol processing circuit 131 receives the 8B/10B decoded data 11. The COM symbol processing circuit 131 outputs a COM symbol detection signal 136 to the state machine when four COM symbols are continuously detected. The TSn ordered set processing circuit 132 receives the state from the state machine 135. The TSn ordered set processing circuit 132 outputs a TSn processing end signal 137 to the state machine at the time at which the TSn counter counts to M−1 in a predetermined state.

The SKP ordered set processing circuit 133 receives the state from the state machine 135. The SKP ordered set processing circuit 133 outputs an SKP processing end signal 138 to the state machine 135 in a predetermined state when the SKP counter counts up to K−1. The LFSR initialization signal processing circuit 134 receives the 8B/10B decoded data 11 and the state from the state machine 135. The LFSR initialization signal processing circuit 134 generates and outputs the LFSR initialization signal 12. The LFSR initialization signal processing circuit 134 outputs an initialization signal processing end signal 139 to the state machine 135 when the LFSR initialization signal processing is ended.

Figure 15:
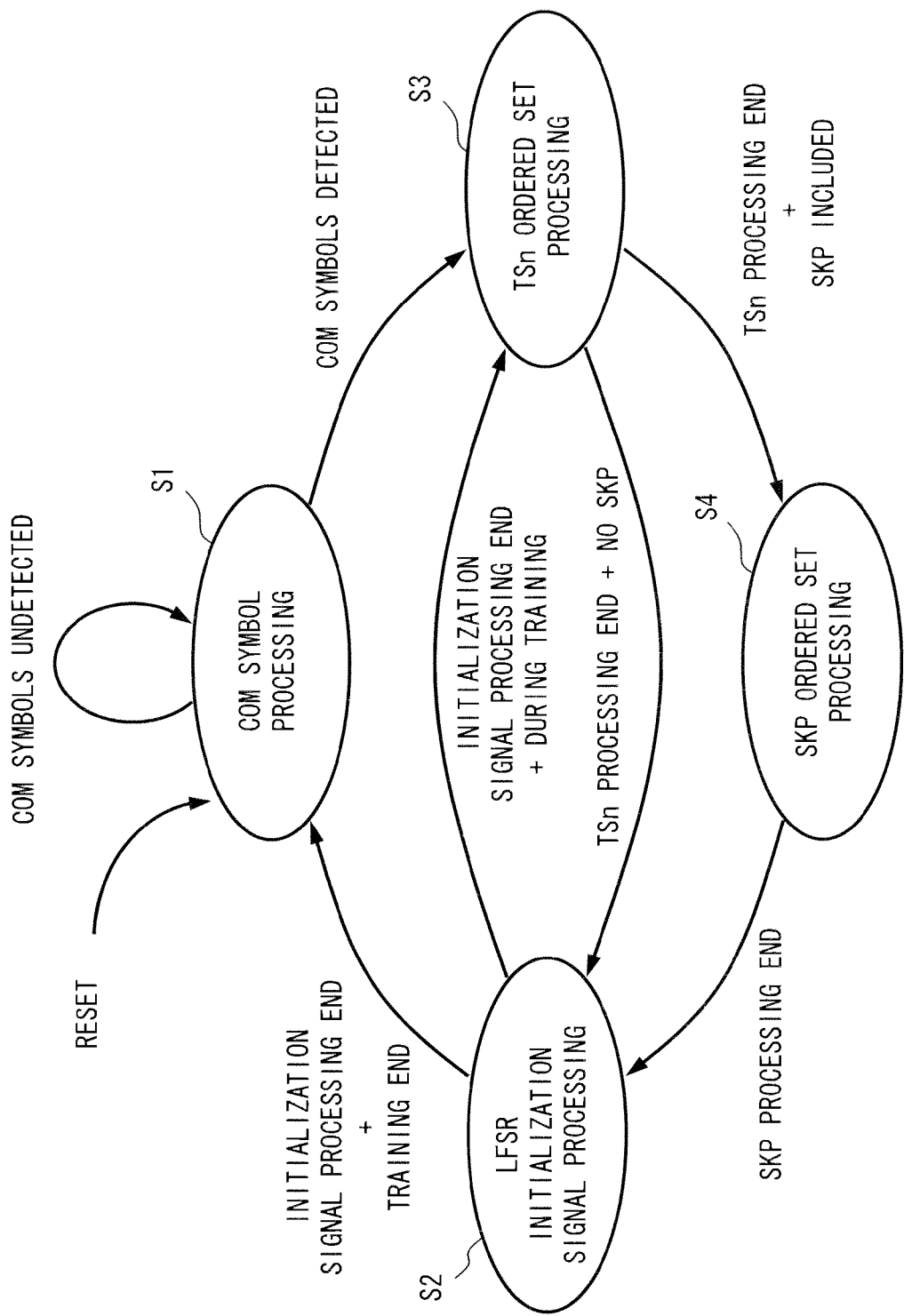
FIG. 15 is a diagram for describing states in a state machine in the data transfer apparatus according to the second embodiment of the present invention.

FIG. 15 is a diagram for describing states in the state machine according to the second embodiment. As shown in FIG. 15, in the state in which the COM symbol has not been detected yet, the state is a COM symbol processing S1. When four COM symbols are continuously detected, the state transits to a TSn ordered set processing S3. When the TSn ordered set processing is ended and the SKP ordered set is inserted next, the state transits to an SKP ordered set processing S4. On the other hand, when the TSn ordered processing is ended and the SKP ordered set is not inserted next, the state transits to an LFSR initialization signal processing S2. Further, when the initialization signal processing is ended in the LFSR initialization signal processing S2 and the training is still being performed, the state transits to the TSn ordered set processing S3. Also when the SKP ordered processing is ended in the SKP ordered set processing S4, the state transits to the LFSR initialization signal processing S2. When the initialization signal processing is ended and the signal indicating the end of the training is input in the LFSR initialization signal processing S2, the state transits to the COM symbol processing S1.

Figure 16:
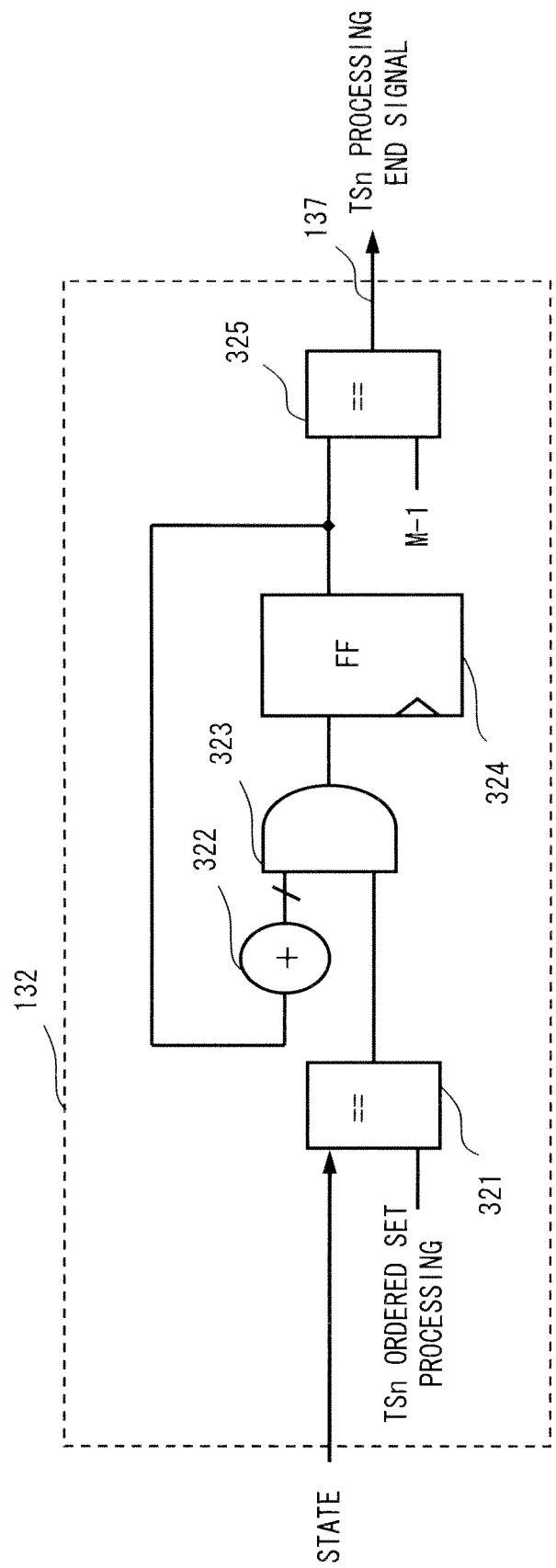
FIG. 16 is a circuit diagram showing a TSn ordered set processing circuit included in the LFSR initialization circuit in the data transfer apparatus according to the second embodiment of the present invention.
Figure 17:
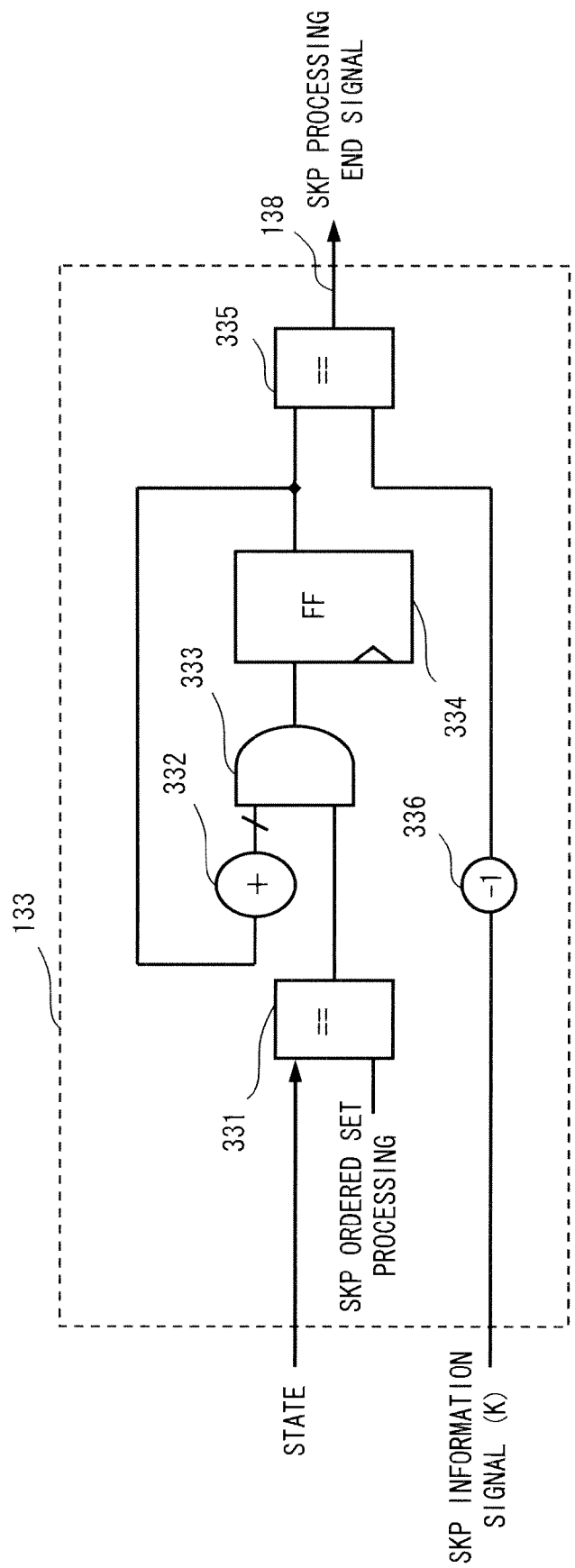
FIG. 17 is a circuit diagram showing an SKP ordered set processing circuit 133 included in the LFSR initialization circuit in the data transfer apparatus according to the second embodiment of the present invention.
Figure 18:
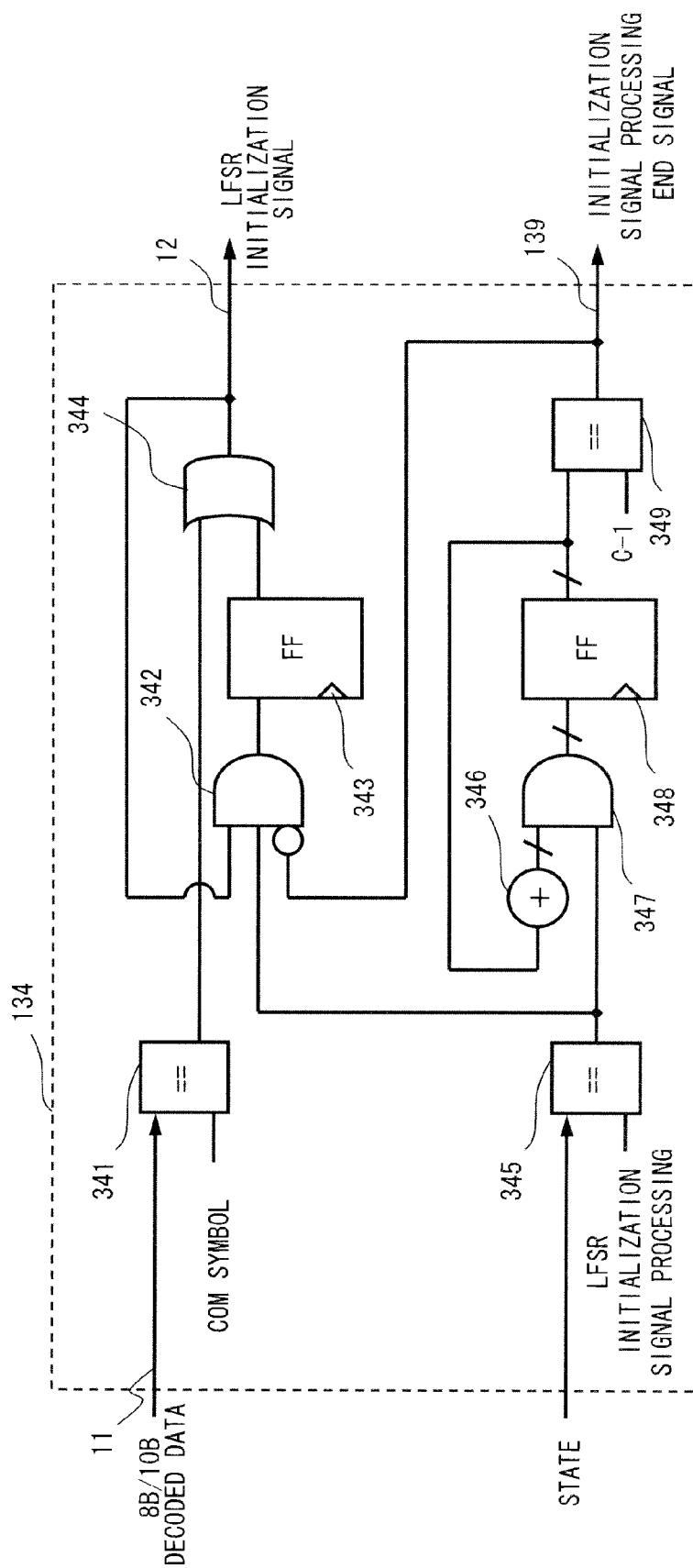
FIG. 18 is a circuit diagram showing an LFSR initialization signal processing circuit 134 included in the LFSR initialization circuit in the data transfer apparatus according to the second embodiment of the present invention.

Next, detail of the COM symbol processing circuit 131, the TSn ordered set processing circuit 132, the SKP ordered set processing circuit 133, and the LFSR initialization signal processing circuit 134 will be described. Note that the COM symbol processing circuit 131 has the similar configuration as that of FIG. 5 according to the first embodiment. Accordingly, in this description, specific examples of the TSn ordered set processing circuit 132, the SKP ordered set processing circuit 133, and the LFSR initialization signal processing circuit 134 will be described. FIGS. 16 to 18 are circuit diagrams showing the TSn ordered set processing circuit 132, the SKP ordered set processing circuit 133, and the LFSR initialization signal processing circuit 134, respectively.

First, as shown in FIG. 16, the TSn ordered set processing circuit 132 includes a comparator 321, an adder 322, a multi-bit AND circuit 323, an F/F 324, and a comparator 325. The comparator 321 determines whether the current state is "TSn ordered set processing period". The comparator 325 determines whether an output of the F/F 324 is M−1. The adder 322, the multi-bit AND circuit 323, and the F/F 324 form the TSn counter.

In the TSn ordered set processing circuit 132 thus formed, 1 is output from the comparator 321 while the state is in the "TSn ordered processing period", and the counter starts count-up from 1. The TSn ordered set processing circuit 132 counts up to M−1, and outputs the TSn processing end signal 137 when the output of the F/F 324, or the count value reaches M−1.

Next, as shown in FIG. 17, the SKP ordered set processing circuit 133 includes a comparator 331, an adder 332, a multi-bit AND circuit 333, an F/F 334, a subtractor 336, and a comparator 335. The comparator 331 determines whether the current state is the "SKP ordered set processing period". The comparator 335 determines whether an output from the F/F 334 is K−1. The adder 332, the multi-bit AND circuit 333, and the F/F 334 form an SKP counter.

In the SKP ordered set processing circuit 133 thus formed, an SKP information signal (K) is subtracted by the subtractor 336 to K−1. While the state is the "TSn ordered processing period", 1 is output from the comparator 331, and the counter starts count-up from 1. The SKP ordered set processing circuit 133 counts up to K−1, and outputs the SKP processing end signal 138 when the output of the F/F 334, or the count value reaches K−1.

Last, as shown in FIG. 18, the LFSR initialization signal processing circuit 134 receives the 8B/10B decoded data 11. The LFSR initialization signal processing circuit 134 includes a comparator 341, an AND circuit 342, a flip-flop F/F 343, an OR circuit 344, a comparator 345, an adder 346, a multi-bit AND circuit 347, an F/F 348, and a comparator 349. The comparator 341 determines whether the 8B/10B decoded data 11 is a COM symbol. The comparator 345 determines whether the state is the "LFSR initialization signal processing period", and outputs the signal to initialize the LFSR. The comparator 349 determines whether the count value of the initialization counter is C−1, and outputs the initialization signal processing end signal 139. The adder 346, the multi-bit AND circuit 347, and the F/F 348 form the initialization counter that counts up from 0 to C−1.

When the COM symbol is input from the 8B/10B decoded data 11, the comparator 321 outputs 1. Thus, the OR 344 outputs 1, and the LFSR initialization signal 12. In short, the LFSR initialization signal 12 is output while the COM symbol is detected. Further, while the LFSR initialization signal processing is executed, the comparator 345 outputs 1, which is then supplied to the AND 342. The comparator 349 outputs 0 until when the value (count value) of the F/F 348 reaches C−1, which is then inverted and supplied to the AND 342. Accordingly, the output of the AND 342 is 1, and so is the output of the F/F 343 until when the C-th COM symbol is detected (until when the count value becomes C−1 since the count starts from 0 in the second embodiment), and the value 1 is supplied to the OR 344. Therefore, even when the COM symbol is not detected, the LFSR initialization signal 12 is output until when the count value of the COM symbol reaches C−1.

The thus-formed LFSR initialization signal processing circuit 134 repeatedly counts the initialization counter, detects the COM symbol included in the 8B/10B decoded data 11, and outputs the LFSR initialization signal 12 while the COM symbol is detected or from when the COM symbol is detected until when the Z-th symbol is detected (the LFSR initialization signal 12 becomes 1).

In summary, the number of symbols or pieces of data determined according to the specification and the reception state of the high-speed serial communication is counted, and the initialization signal 12 that initializes the LFSR is generated at least at a timing at which the last COM symbol included in the TSn ordered set is input to the descrambling circuit 10 (second initialization timing) based on the count value. As described with reference to FIG. 18, it is assumed that the LFSR initialization signal processing circuit 134 always sets the LFSR initialization signal 12 to 1 in the period in which the COM symbols are received during the training period after the COM symbol processing.

In this example, the number of pieces of data M in the TSn ordered set and the number of COM symbols C in the TSn ordered set are determined by the specification, and the number of SKP symbols K in the SKP ordered set is determined by the reception state.

Figure 19:
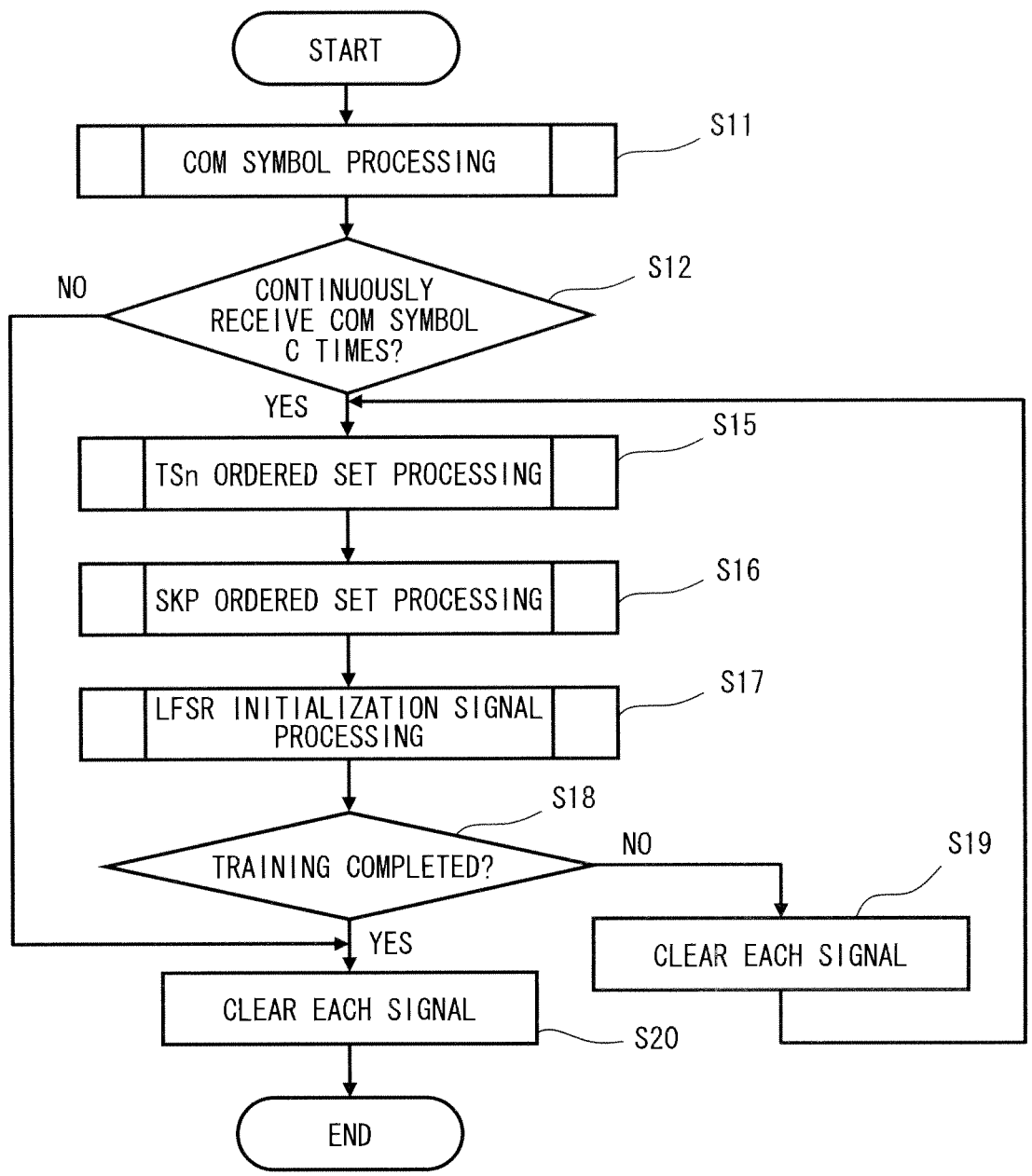
FIG. 19 is a flow chart showing operations of the LFSR initialization circuit in the data transfer apparatus according to the second embodiment of the present invention.
Figure 20:
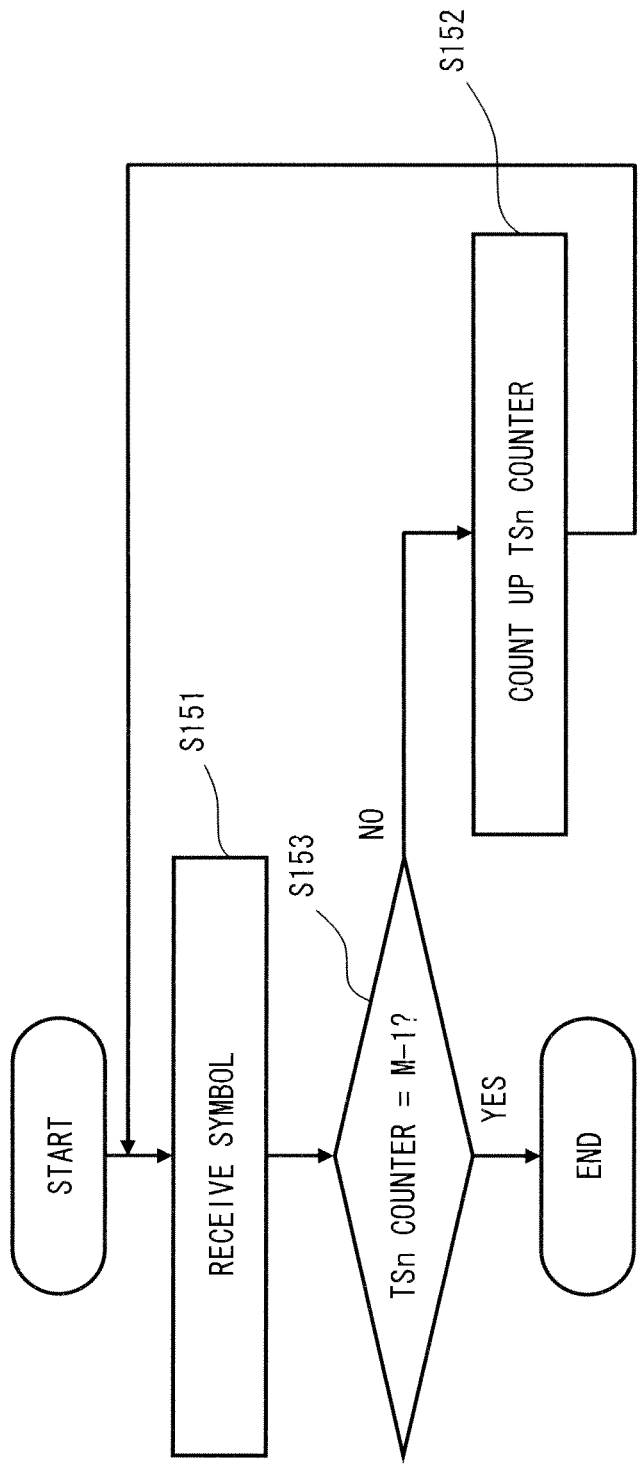
FIG. 20 is a flow chart showing TSn ordered set processing of the LFSR initialization circuit in the data transfer apparatus according to the second embodiment of the present invention.
Figure 21:
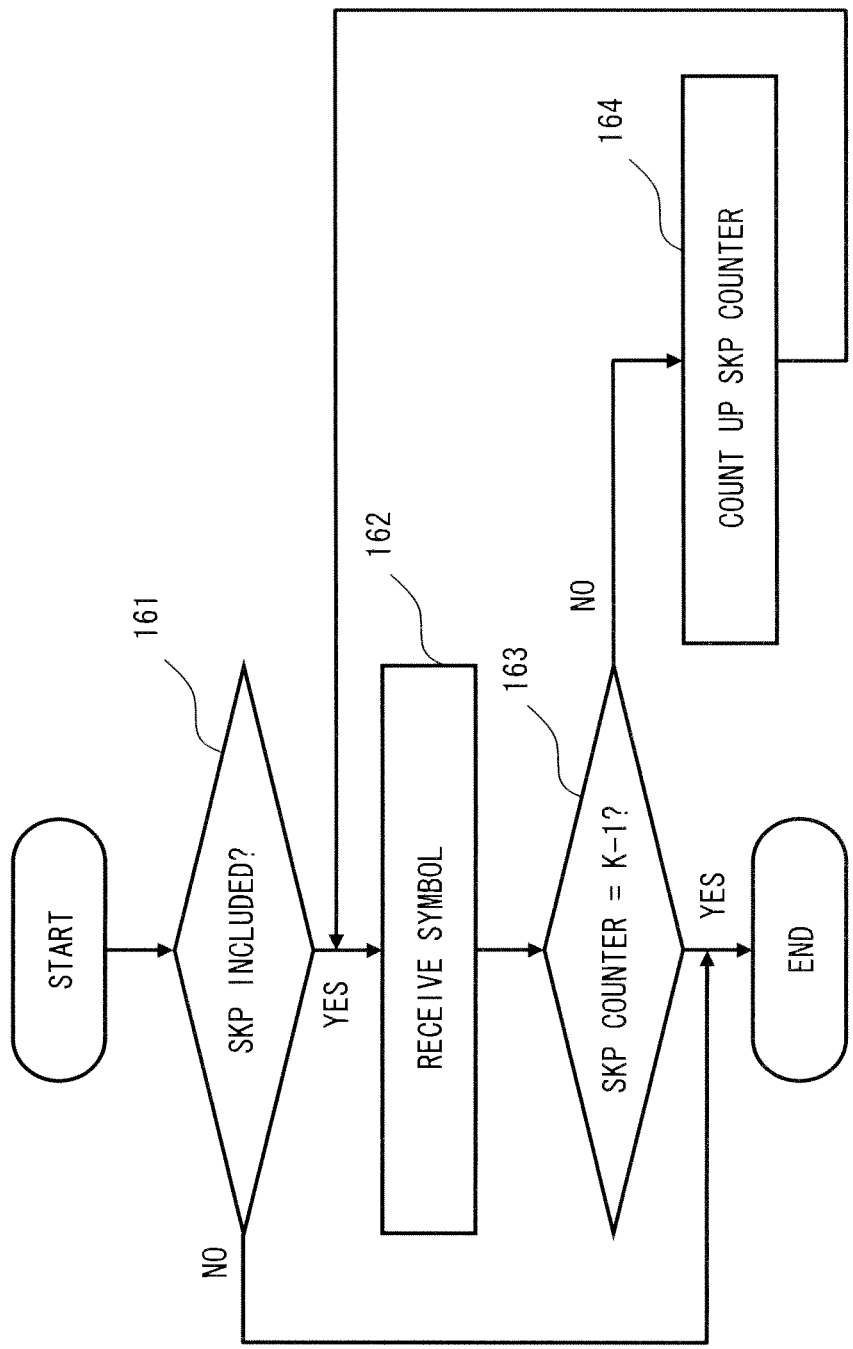
FIG. 21 is a flow chart showing SKP ordered set processing of the LFSR initialization circuit in the data transfer apparatus according to the second embodiment of the present invention.
Figure 22:
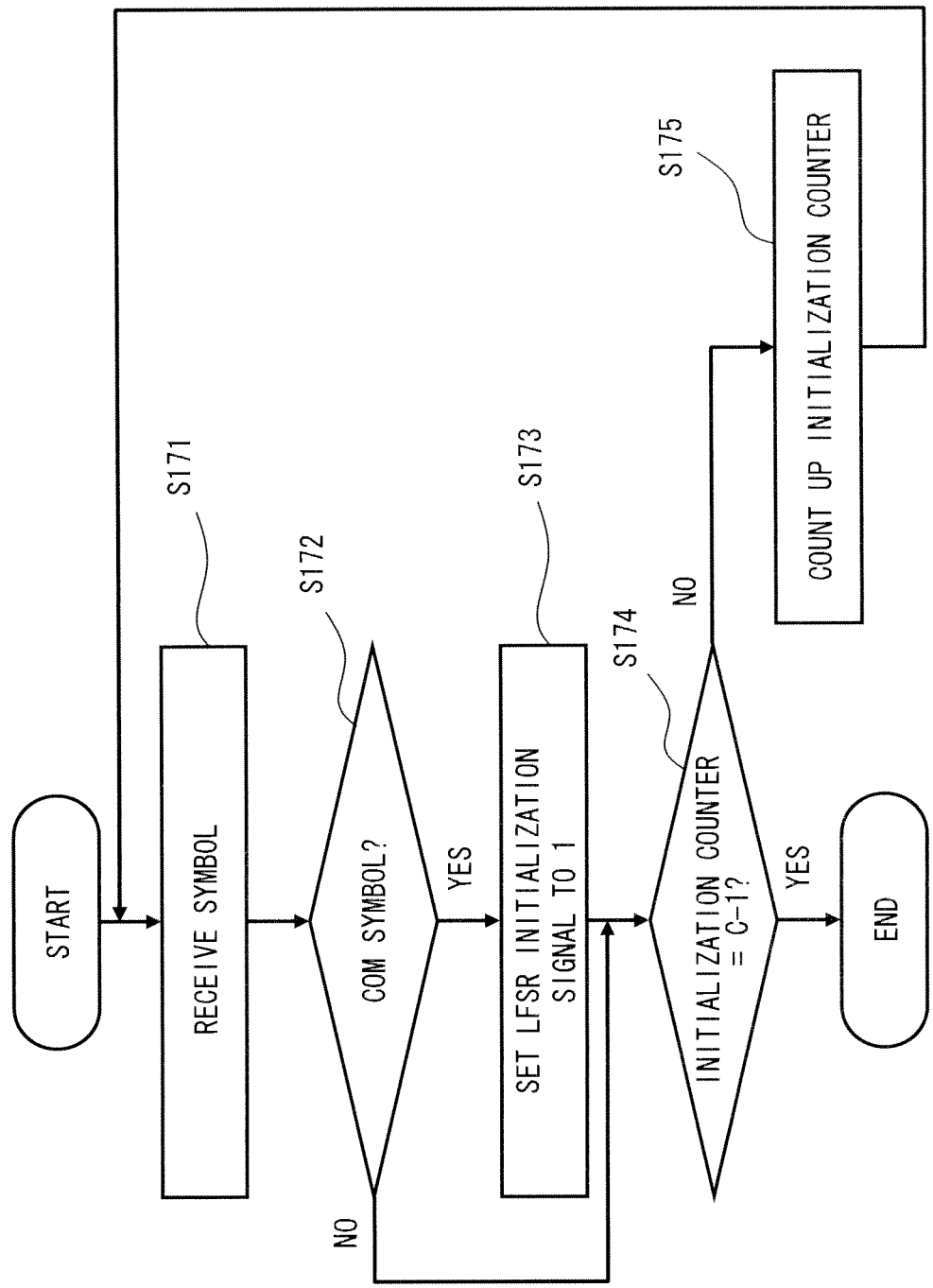
FIG. 22 is a flow chart showing LFSR initialization signal processing of the LFSR initialization circuit in the data transfer apparatus according to the second embodiment of the present invention.

Next, an operation of the LFSR initialization circuit 13 according to the second embodiment will be described. FIG. 19 is a flow chart showing an operation of the LFSR initialization circuit 13, FIG. 20 is a flow chart showing the TSn ordered set processing, FIG. 21 is a flow chart showing the SKP ordered set processing, and FIG. 22 is a flow chart showing the LFSR initialization signal processing.

The data receiving apparatus receives a plurality of TSn ordered sets during the training in the high-speed communication. The LFSR initialization circuit 13 repeats the TSn ordered set processing (step S15), the SKP ordered set processing (step S16), and the LFSR initialization signal processing (step S17) as long as the TSn ordered set is received after the first normal TSn ordered set is received at steps S11 to S12 (after the C COM symbols are normally received).

The reception of the normal TSn ordered set is determined by detecting in the COM symbol processing (step S11) how many times the COM symbols forming the TSn ordered set are continuously received, and determining at step S12 whether a predetermined number (C) of COM symbols are continuously received. When the COM symbols are not continuously received for C times, each signal is cleared (step S20), and the processing is ended. When the USB 3.0 is used, C is 4.

After it is determined at step S12 that the normal TSn ordered set is received, the LFSR initialization signal is generated as follows. First, the processing of the TSn ordered set other than the COM symbols is performed (step S15), following the processing of the SKP ordered set between the TSn ordered sets is performed (step S16), following the processing of the LFSR initialization signal is performed (step S17).

When four COM symbols cannot be received at step S11 (step S12: No), this flow is ended. In such a case, the COM symbol processing is performed again.

Last, it is determined whether the training is completed (step S18). A signal indicating the "training period" generated by a state machine of an existing circuit that controls training outside the LFSR initialization circuit may be used for the determination, or the LFSR initialization signal 12 generated by the LFSR initialization signal processing described later may be used for the determination. When the training is not completed (step S18: No), the process goes back to the TSn ordered set processing at step S15; when the training is completed (step S18: Yes), this flow is ended. After determining that the training is completed at step S18 in FIG. 19, the internal signals of the LFSR initialization signal 12 and the LFSR initialization circuit 13 are all cleared after the training completion is determined at step S18 in FIG. 19 regardless of whether the condition is established or not (steps S19 and S20).

The processing of the COM symbol at step S11 is similar to that in the first embodiment shown in FIG. 8. The training in the high-speed communication is performed by transmitting or receiving a plurality of TSn ordered sets, each including C COM symbols and M data symbols. At step S11, a TSn ordered set that normally includes four COM symbols the first time is searched in the training. In summary, when at least one COM symbol in the first TSn ordered set is corrupted, the COM symbols in the next TSn ordered set are counted. Upon normal detection of C COM symbols, the COM symbol processing is ended. In this case, since it is determined as Yes at step S12, the process proceeds to the TSn ordered set processing.

Next, the processing of the TSn ordered set will be described. As shown in FIG. 20, the TSn ordered set includes C COM symbols and M symbols other than the COM symbols. In this flow, the number of symbols other than the COM symbols is counted to determine the end of the TSn ordered set.

The number of data symbols other than the COM symbols forming the TSn ordered set is denoted by M. When the USB 3.0 is used, M is 12. The TSn counter denotes the number of symbols received while the TSn ordered set is received. Since the count value starts from 0, the TSn counter counts up to M−1.

After the symbol is received at step S151, the TSn counter in the TSn ordered set processing circuit 132 is counted up at step S152. When the TSn counter reaches M−1 at step S153, it is determined that all the TSn ordered sets are received, and the process is ended. When the value of the TSn counter is other than M−1, the TSn counter is counted up (step S152), and the process goes back to symbol reception at step S151. In this way, the number of symbols is counted up to M−1 in the TSn ordered set processing. As described with reference to FIG. 16, it may be possible to determine whether the state is the "TSn ordered set processing period", to count-up the period of the state in the TSn ordered set processing using a clock or the like.

Next, processing of the SKP ordered set at step S16 will be described. As shown in FIG. 21, the SKP ordered set may be inserted between the TSn ordered sets for adjusting the timings. In this flow, the number of SKP ordered sets is counted to specify the start position of the next TSn ordered set. The SKP counter in the SKP ordered set processing circuit 133 counts the number of symbols received while the SKP ordered set is received.

The SKP ordered set processing circuit 133 obtains the number of symbols K of the SKP ordered set inserted by the elastic buffer circuit 7. When the SKP ordered set is not inserted, K is 0. Since the counter counts up from 0, the number is counted up to K−1.

First, it is determined whether the SKP ordered set is inserted (step S161). When it is determined that there is no SKP ordered set (the number of symbols K=0), the flow is ended (step S161: No). When it is determined that there is an SKP ordered set (the number of symbols K>0), the processing of the SKP ordered set is executed. Specifically, after the symbol is received (step S162), when the count value of the SKP counter in the SKP ordered set processing circuit 133 is not K−1 (step S163: No), this counter is counted up (step S164). When the SKP counter reaches K−1 at step S163, it is recognized that all the SKP ordered sets are received and the processing is ended. As described with reference to FIG. 17, it may be possible to determine whether the state is the "SKP ordered set processing period", to count up the period of the state in the SKP ordered set processing.

Next, the processing flow of the LFSR initialization signal at step S15 will be described. In the LFSR initialization signal processing, the LFSR initialization signal is generated to initialize the LFSR at least at the position of the last COM symbol of the next TSn ordered set. In the second embodiment, the LFSR initialization signal 12 is set to 1 for four symbols receiving the COM symbol. The signal C denotes the number of COM symbols forming the TSn ordered set. When the USB 3.0 is used, C is 4. The initialization counter of the LFSR initialization signal processing circuit 134 counts the number of symbols received while the COM symbol of the next TSn ordered set is received. Since the count value starts from 0, it is counted up to C−1.

First, as shown in FIG. 22, when the symbol received at step S171 is a COM symbol (step S172: Yes), the LFSR initialization signal processing circuit 134 sets the LFSR initialization signal 12 to 1 at step S173 to output 1.

Next, when the value of the initialization counter is not C−1 (step S174: No), the initialization counter is counted up to go back to the symbol reception at step S171 (step S175). When the value of the initialization counter is C−1 (step S174: Yes), the processing is ended.

Figure 23A:
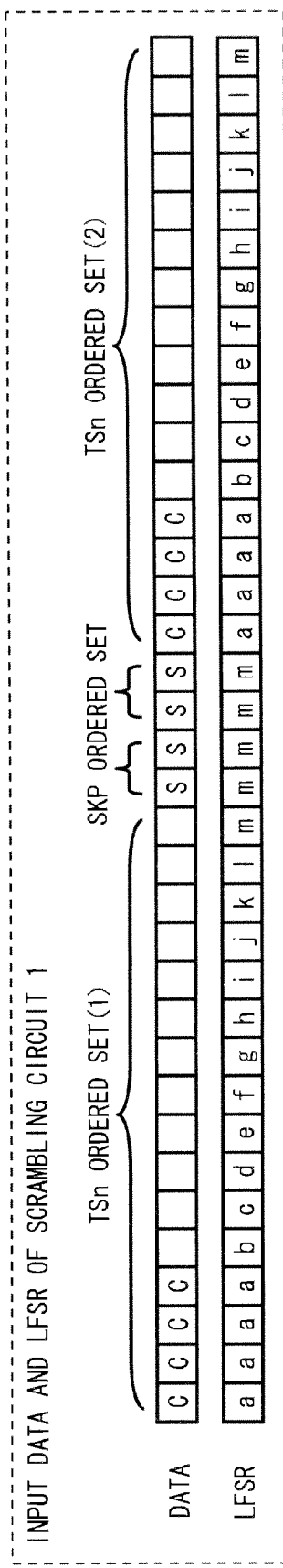
FIG. 23A is a diagram showing a timing chart of the LFSR initialization circuit in the data transfer apparatus according to the second embodiment of the present invention.
Figure 23B:
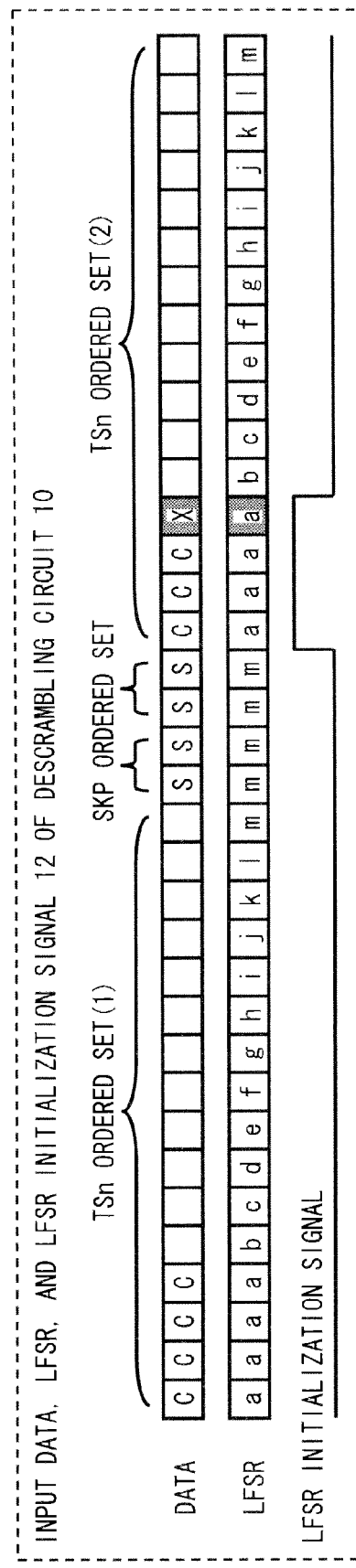
FIG. 23B is a diagram showing a timing chart of the LFSR initialization circuit in the data transfer apparatus according to the second embodiment of the present invention.
Figure 24:
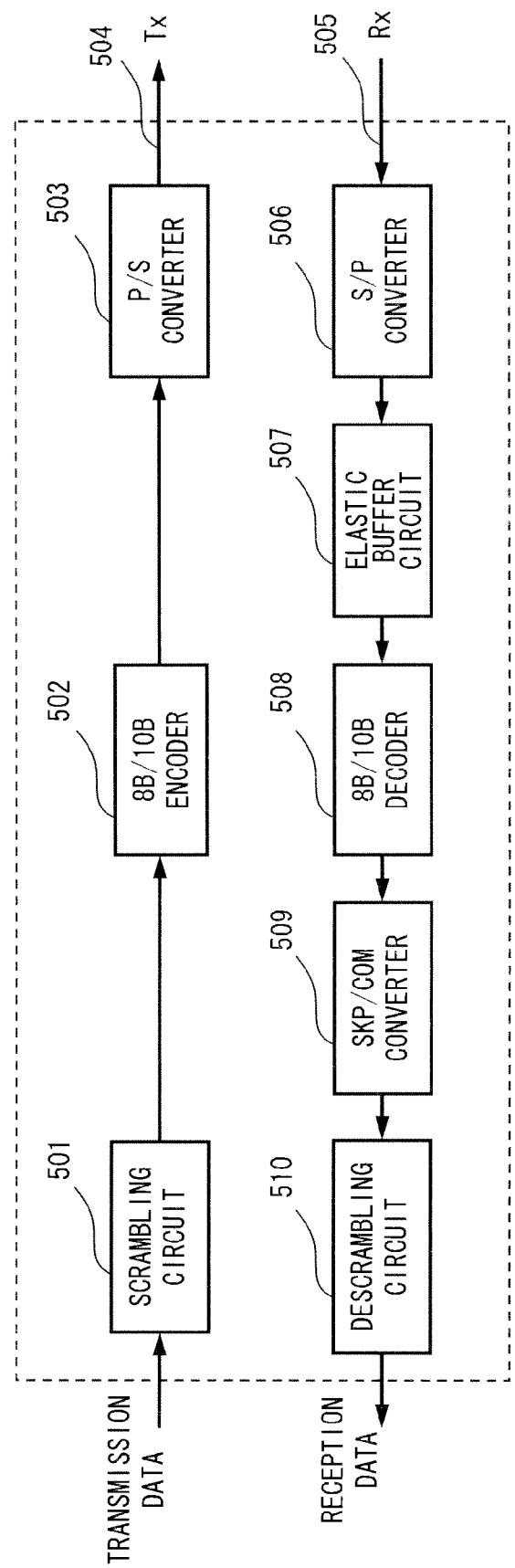
FIG. 24 is a diagram showing a data transfer apparatus disclosed in Japanese Unexamined Patent Application Publication No. 2005-268910.
Figure 25:
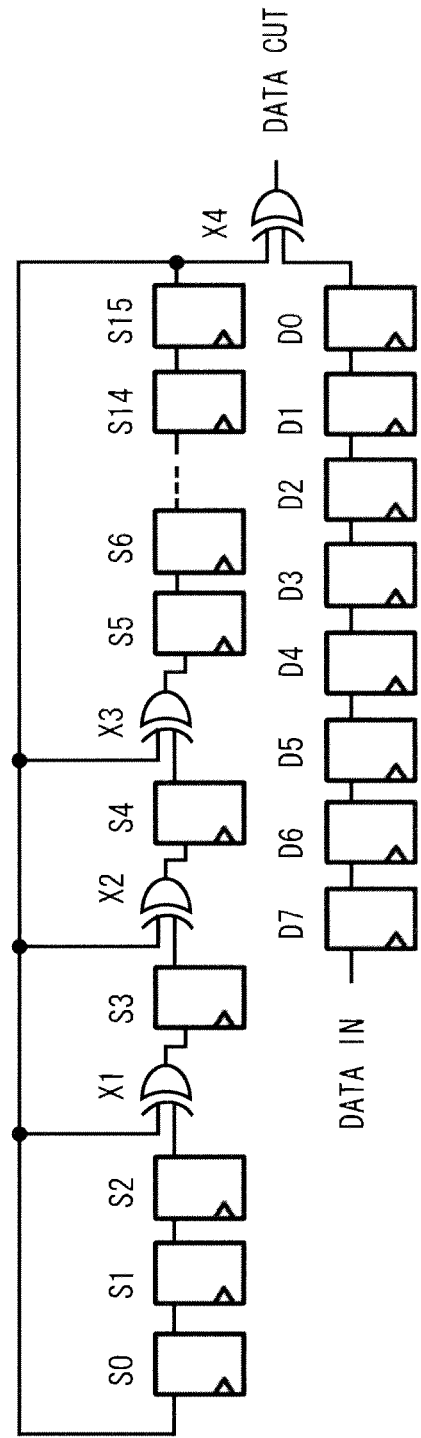
FIG. 25 is a circuit diagram showing a linear feedback shift register (LFSR)
Figure 27A:
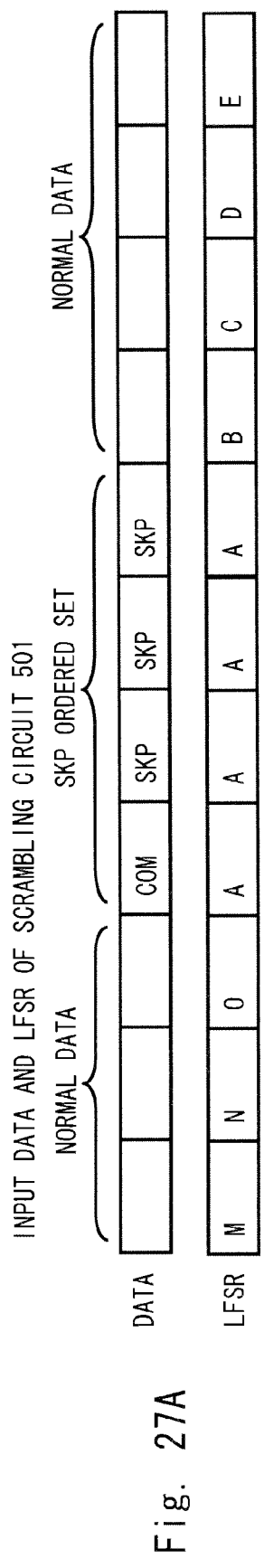
FIG. 27A is a diagram for describing data input to a scrambling circuit of a data receiving apparatus disclosed in Japanese Unexamined Patent Application Publication No. 2005-268910.
Figure 27B:
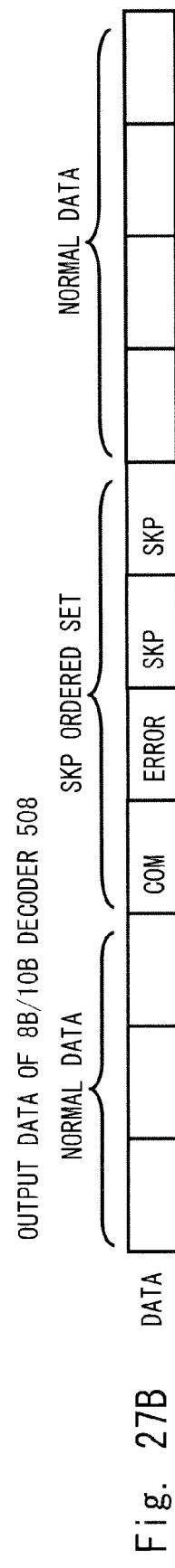
FIG. 27B is a diagram for describing data input to a decoder of the data receiving apparatus disclosed in Japanese Unexamined Patent Application Publication No. 2005-268910.
Figure 27C:
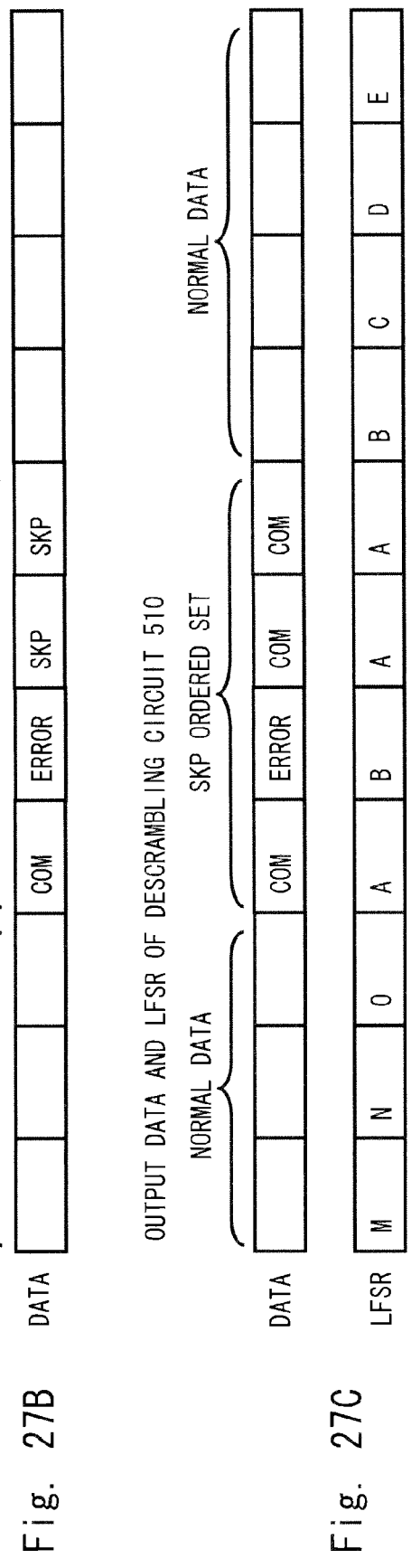
FIG. 27C is a diagram for describing data input to a descrambling circuit of the data receiving apparatus disclosed in Japanese Unexamined Patent Application Publication No. 2005-268910.

FIGS. 23A and 23B are timing charts of the scrambling circuit in the transmission side and the descrambling circuit in the reception side shown in FIG. 12.

In FIG. 23A, data is input data of the scrambling circuit 1 which is the transmission side, and an LFSR is a timing chart of an internal signal (showing a state of the scrambler) of the scrambling circuit 1.

In FIG. 23B, data is input data (8B/10B decoded data 11) of the descrambling circuit 10 which is the reception side, an LFSR is an internal signal (showing a state of the descrambler) of the descrambling circuit 10, and the LFSR initialization signal 12 is a signal generated by the LFSR initialization circuit 13 and resetting the descrambler.

FIG. 23B shows a case in which, among the TSn ordered sets transmitted from the Tx 4 in the transmission side shown in FIG. 12 through the transmission line, the last COM symbol of the last TSn ordered set (2) is corrupted in the Rx in the reception side shown in FIG. 12.

The LFSR initialization signal 12 generated by the LFSR initialization circuit 13 according to the flow charts shown in FIGS. 8 and 19 to 22 at the timings shown in FIG. 23B initializes the LFSR regardless of the type of the symbol of the 8B/10B decoded data 11 when the LFSR initialization signal is 1. Note that, in this example, four COM symbols are continuously input. The LFSR initialization signal 12 may be set to 1 at least at a timing (initialization last timing T1) at which the fourth COM symbol is input to the descrambling circuit 10.

In the second embodiment, even when the last LFSR initialization symbol is corrupted among a plurality of LFSR initialization symbols (COM symbols) included in the TSn ordered set forming the training data set, the LFSR operation of the descramble processing in the reception side is associated with the LFSR operation of the scramble processing in the transmission side, and the following data can also be normally decoded and received, whereby the connection can be established without re-executing the training.

The reason for it is as follows. That is, first, in the operation of the LFSR initialization circuit 13 shown in FIG. 14, the first normal TSn ordered set is detected in the COM symbol processing (step S11 shown in FIGS. 8 and 19). Then, from the TSn ordered set processing (FIG. 20), the SKP ordered set processing (FIG. 21), and the processing of the LFSR initialization signal (FIG. 22), the position of the LFSR initialization symbol included in the subsequent connection establishing data set is specified to generate the LFSR initialization signal 12. Then, as shown in FIG. 23B, the LFSR is initialized by using the LFSR initialization signal 12 regardless of the type of the symbol of the 8B/10B decoded data 11. Therefore, the LFSR of the descrambling circuit 10 is reset even when the last COM symbol is corrupted. Accordingly, it is possible to associate the LFSR of the scrambling circuit in the transmission side and the LFSR of the descrambling circuit 10 in the reception side, and to normally decode and receive the subsequent symbols.

The present invention is not limited to the embodiments described above, but can be changed in various ways without departing from the scope of the present invention. For example, in the above embodiments, each counter included in the LFSR initialization circuit 9 or the LFSR initialization circuit 13 may be shared as shown in FIGS. 2A and 13 for the exclusive operation.

Furthermore, although the present invention has been described as a hardware configuration in the embodiments described above, it is not limited to this. The present invention may achieve any desired processing by causing a central processing unit (CPU) to execute a computer program. In this case, the computer program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (programmable ROM), EPROM (Erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The first and second embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A receiving apparatus that receives scrambled data by serial communication, comprising:
   an initialization signal generation circuit configured to generate an initialization signal; and
   a descramble circuit configured to descramble reception data by a descrambler initialized by the initialization signal, wherein
   the reception data comprises a training data set for establishing connection of the serial communication, the training data set comprising one or more connection establishing data sets,
   the connection establishing data set comprises one or more initialization symbols and one or more pieces of data other than the initialization symbols, and
   the initialization signal generation circuit is configured to generate the initialization signal for initializing the descrambler at least at an initialization last timing such that even when a last initialization symbol among the initialization symbols forming a last connection establishing data set of the training data set is corrupted, the descrambler is still initialized by the initialization signal, wherein the initialization last timing is a time at which the last initialization symbol among the initialization symbols forming the last connection establishing data set of the training data set is input to the descrambler.

2. The receiving apparatus according to claim 1, wherein the initialization signal generation circuit is configured to count the number corresponding to the number of symbols or the number of pieces of data included in the connection establishing data set determined by a specification of the serial communication to detect the initialization last timing, and to generate the initialization signal based on the detection result.

3. The receiving apparatus according to claim 2, wherein
   the training data set further comprises a timing adjusting data set; and
   the number corresponding to the number of symbols or the number of pieces of data included in the connection establishing data set determined by the specification of the serial communication is a common factor Z (Z is an integer of two or larger) of the number of initialization symbols and the number of pieces of data other than the initialization symbols forming the connection establishing data set, and the number of symbols forming the timing adjusting data set.

4. The receiving apparatus according to claim 3, wherein the initialization signal generation circuit is configured to detect the initialization symbol included in the training data set while repeatedly counting the Z, to generate the initialization signal for initializing the descrambler at a timing at which the Z-th symbol is detected when the initialization symbol that is detected is the Z-th symbol, and to generate the initialization signal at least at a first initialization timing when the initialization symbol that is detected is less than the Z-th symbol, the first initialization timing being a timing at which a timing for receiving the Z-th symbol first reaches a predetermined number of times.

5. The receiving apparatus according to claim 4, wherein the initialization signal generation circuit comprises:
an initialization symbol processing circuit configured to detect the initialization symbols included in the connection establishing data set before the last connection establishing data set, the number of initialization symbols that are detected corresponding to the number specified by the specification of the serial communication; and
an initialization signal processing circuit comprising a counter configured to repeatedly count the common factor Z and a detection circuit configured to detect the initialization symbol after the initialization symbol processing circuit detects the initialization symbols corresponding to the number specified by the specification, the initialization signal processing circuit generating the initialization signal for initializing the descrambler at the first initialization timing based on the count result and the detection result.

6. The receiving apparatus according to claim 1, wherein the initialization signal generation circuit is configured to count the number of symbols or the number of pieces of data included in the connection establishing data set determined by a reception state and a specification of the serial communication, to detect the initialization last timing and generate the initialization signal based on the detection result.

7. The receiving apparatus according to claim 6, wherein the training data set further comprises a timing adjusting data set, and
the number of symbols or the number of pieces of data included in the connection establishing data set determined by the reception state and the specification of the serial communication is the number of initialization symbols and the number of pieces of data other than the initialization symbols forming the connection establishing data set, and the number of symbols forming the timing adjusting data set.

8. The receiving apparatus according to claim 7, wherein the initialization signal generation circuit comprises first to fourth counters configured to receive the training data set, the first counter counting the number of initialization symbols that are normally received first, the second counter counting the number of pieces of data other than the initialization symbols forming the connection establishing data set, the third counter counting the number of symbols forming the timing adjusting data set, and the fourth counter counting the number of initialization symbols forming the connection establishing data set.

9. The receiving apparatus according to claim 8, comprising an elastic buffer configured to adjust a timing of reception data with a transmission side, wherein
the number of initialization symbols C (C is an integer of one or larger) and the number of pieces of data M other than the initialization symbols (M is an integer of one or larger) forming the connection establishing data set are numbers specified by the specification of the serial communication, and
the number of symbols K (K is an integer of 0 or larger) forming the timing adjusting data set is a value notified from the elastic buffer.

10. The receiving apparatus according to claim 8, wherein the initialization signal generation circuit comprises:
an initialization symbol processing circuit configured to detect the initialization symbols included in the connection establishing data set before the last connection establishing data set, the number of initialization symbols that are detected corresponding to the number C specified by the specification of the serial communication;
a connection establishing data set processing circuit configured to count the number of pieces of data M other than the initialization symbols included in the connection establishing data set after the initialization symbol processing circuit detects the initialization symbols corresponding to the specified number C;
a timing adjusting data set processing circuit configured to count the number of symbols K included in the timing adjusting data set after the count by the connection establishing data set processing circuit is ended; and
an initialization signal processing circuit configured to count the count number C after the count by the timing adjusting data set processing circuit is ended, and to generate the initialization signal for initializing the descrambler at least at a second initialization timing at which the last initialization symbol is input to the descrambler, wherein
after the initialization symbol is detected by the initialization symbol processing circuit and before the reception of the training data set is ended, processing for counting the number of pieces of data M other than the initialization symbols by the connection establishing data set processing circuit, processing for counting the number of symbols K by the timing adjusting data set processing circuit, and processing for counting the count number C and generating the initialization signal by the initialization signal processing circuit are repeated.

11. The receiving apparatus according to claim 2, wherein the initialization signal generation circuit is configured to detect the initialization symbols included in the connection establishing data set before the last connection establishing data set, the number of initialization symbols that are detected corresponding to the number specified by the specification of the serial communication, thereafter the initialization signal generation circuit is configured to start the count to detect the initialization last timing.

12. The receiving apparatus according to claim 11, wherein the initialization signal processing circuit is configured to generate the initialization signal that initializes the descrambler during a period at which the initialization symbols are included in the connection establishing data set after the initialization symbols corresponding to the number specified by the specification of the serial communication are detected and before the reception of the training data set is ended.

13. A receiving method that receives scrambled reception data by serial communication, wherein:
the reception data comprises a training data set for establishing connection of the serial communication, the training data set comprising one or more connection establishing data sets, and
the connection establishing data set comprises one or more initialization symbols and one or more pieces of data other than the initialization symbols, the method comprising:

generating an initialization signal that initializes a descrambler at least at an initialization last timing at which a last initialization symbol among the initialization symbols forming a last connection establishing data set included in the training data set is input to the descrambler such that even when the last initialization symbol among the initialization symbols forming the last connection establishing data set of the training data set is corrupted, the descrambler is still initialized by the initialization signal; and descrambling the reception data by the descrambler initialized by the initialization signal.

14. The receiving method according to claim 13, wherein, when the initialization signal is generated, the number corresponding to the number of symbols or the number of pieces of data included in the connection establishing data set determined by a specification of the serial communication is counted, to detect the initialization last timing and generate the initialization signal based on the detection result.

15. The receiving method according to claim 14, wherein the training data set further comprises a timing adjusting data set; and the number corresponding to the number of symbols or the number of pieces of data included in the connection establishing data set determined by the specification of the serial communication is a common factor Z (Z is an integer of two or larger) of the number of initialization symbols and the number of pieces of data other than the initialization symbols forming the connection establishing data set, and the number of symbols forming the timing adjusting data set.

16. The receiving method according to claim 13, wherein, when the initialization signal is generated, the number of symbols or the number of pieces of data included in the connection establishing data set determined by a reception state and a specification of the serial communication is counted, to detect the initialization last timing and the initialization signal is generated based on the detection result.

17. The receiving method according to claim 16, wherein the training data set further comprises a timing adjusting data set, and the number of symbols or the number of pieces of data included in the connection establishing data set determined by the reception state and the specification of the serial communication is the number of initialization symbols and the number of pieces of data other than the initialization symbols forming the connection establishing data set, and the number of symbols forming the timing adjusting data set.

18. The receiving method according to claim 16, comprising:

when the initialization signal is generated, detecting the initialization symbols included in the connection establishing data set before the last connection establishing data set, the number of initialization symbols that are detected corresponding to the number C specified by the specification of the serial communication;

counting the number of pieces of data M other than the initialization symbol S included in the connection establishing data set after detecting the initialization symbols corresponding to the specified number C;

counting the number of symbols K included in the timing adjusting data set after the count of the number of pieces of data M is ended; and counting the count number C after the count of the number of symbols K is ended, and generating the initialization signal for initializing the descrambler at least at a second initialization timing at which the last initialization symbol is input to the descrambler, wherein after the predetermined number C of initialization symbols are detected and before the reception of the training data set is ended, processing for counting the number of pieces of data M other than the initialization symbols, processing for counting the number of symbols K, processing for counting the count number C, and the initialization signal generation processing are repeated.

19. The receiving method according to claim 14, wherein, when the initialization signal is generated, the initialization symbols included in the connection establishing data set before the last connection establishing data set are detected, the number of initialization symbols that are detected corresponding to the number specified by the specification of the serial communication, thereafter the count is started to detect the initialization last timing.

20. A non-transitory computer readable medium that stores a program, the program being executed by a computer to cause the computer to perform processing for receiving scrambled reception data by serial communication, wherein:

the reception data comprises a training data set for establishing connection of the serial communication, the training data set comprising one or more connection establishing data sets, and the connection establishing data set comprises one or more initialization symbols and one or more pieces of data other than the initialization symbols, the non-transitory computer readable medium storing the program being executed by the computer to cause the computer to perform the following processing of:

generating an initialization signal that initializes a descrambler at least at an initialization last timing at which a last initialization symbol among the initialization symbols forming a last connection establishing data set included in the training data set is input to the descrambler such that even when the last initialization symbol among the initialization symbols forming the last connection establishing data set of the training data set is corrupted, the descrambler is still initialized by the initialization signal; and descrambling the reception data by the descrambler initialized by the initialization signal.

\* \* \* \* \*